United States Patent
Shotey et al.

(10) Patent No.: US 6,642,453 B2
(45) Date of Patent: Nov. 4, 2003

(54) CONVERTIBLE ELECTRICAL DEVICE COVER AND METHOD FOR INSTALLING SAME

(75) Inventors: Michael J. Shotey, Scottsdale, AZ (US); Marcus J. Shotey, Scottsdale, AZ (US); Edgar W. Maltby, Mesa, AZ (US)

(73) Assignee: TayMac Corporation, Gilbert, AZ (US)

( * ) Notice: Subject to any disclaimer, the term of this patent is extended or adjusted under 35 U.S.C. 154(b) by 0 days.

(21) Appl. No.: 09/948,920

(22) Filed: Sep. 7, 2001

(65) Prior Publication Data

US 2003/0066674 A1 Apr. 10, 2003

(51) Int. Cl.$^7$ ................................................. H02G 3/14
(52) U.S. Cl. .............................. 174/66; 174/67; 174/53; 220/241
(58) Field of Search ..................... 174/66, 67, 53, 174/50; 220/3.8, 3.7, 3.2, 3.3, 3.94, 241, 242; 200/333, 339, 331, 330; D8/350, 351, 352, 353; D14/143, 137

(56) References Cited

U.S. PATENT DOCUMENTS

| | | | | |
|---|---|---|---|---|
| 3,104,774 A | | 9/1963 | Hudson et al. | |
| 3,438,534 A | * | 4/1969 | Zerwes | 220/241 |
| 3,987,928 A | * | 10/1976 | Mori | 220/241 |
| 5,280,135 A | | 1/1994 | Berlin et al. | |
| D350,530 S | | 9/1994 | Comerci et al. | |
| 5,449,860 A | * | 9/1995 | Buckshaw et al. | 174/67 |
| 5,456,373 A | * | 10/1995 | Ford | 220/230 |
| 5,651,696 A | | 7/1997 | Jennison | |
| 5,763,831 A | | 6/1998 | Shotey et al. | |
| 5,998,735 A | * | 12/1999 | Patterson, Jr. | 174/67 |
| 6,051,785 A | * | 4/2000 | Baldwin et al. | 174/54 |
| 6,278,062 B1 | * | 8/2001 | Sowdon | 174/66 |
| 6,364,673 B1 | * | 4/2002 | Lee | 174/67 |
| 6,420,653 B1 | * | 7/2002 | Shotey et al. | 174/66 |
| 6,420,654 B1 | * | 7/2002 | Shotey et al. | 174/66 |
| 6,441,307 B1 | * | 8/2002 | Shotey et al. | 174/66 |

* cited by examiner

Primary Examiner—Chau N. Nguyen
Assistant Examiner—Angel R. Estrada
(74) Attorney, Agent, or Firm—Schmeiser, Olsen & Watts LLP

(57) ABSTRACT

A convertible electrical device cover including a base plate and an adapter plate that are both configured to accommodate an electrical device. When the convertible electrical device cover is placed in an operative position over the electrical device the adapter plate may be located between the electrical device and a rear side of the base plate. A method for installing a convertible electrical device cover is also disclosed including placing the convertible electrical device cover in an operative position over an electrical device so that an adapter plate may be located between the electrical device and a rear side of a base plate.

81 Claims, 12 Drawing Sheets though similar in structure to the current invention, is not identical and the features that distinguish my invention from it are contained in the description of the present application.

CONVERTIBLE ELECTRICAL DEVICE COVER AND METHOD FOR INSTALLING SAME

BACKGROUND OF THE INVENTION

1. Technical Field

This invention generally relates to covers for electrical devices, and more specifically relates to a convertible electrical device cover and method for installing same.

2. Background Art

Electrical devices used in conjunction with electrical device boxes vary and include electrical outlets (both standard and ground fault current interrupts), light switches (both toggle and rocker plates), rounds, and cable television and/or telephone ports. Conventional covers for electrical device boxes are designed to try and prevent inadvertent access to the electrical conductive elements of electrical devices and to hide associated wiring. Each type of electrical device requires different dimensioned access openings in a cover to accommodate it. However, conventional covers usually are non-convertible in their design, and therefore, each electrical device requires a different type of conventional cover configured for it. Moreover, conventional covers usually are not capable of use with both single-gang and/or double-gang electrical device configurations. Thus, to install or service electrical devices, an electrician must carry several types of conventional covers to each site, which are time consuming and inefficient to install.

Another problem currently facing conventional covers may involve safety issues. For safety, the electrical device should at least be flush with access openings in plastic covers, and the electrical device should protrude through access openings in metal covers. Many conventional covers and related cover assemblies may be unsafe based on this fact. For example, some cover assemblies are designed to have a base separate an insert from the electrical device. Such a cover assembly may be unsafe if the thickness of the base is too great, the electrical device may not protrude far enough to be flush with or extend through the plastic or metal cover access openings respectively.

SUMMARY OF THE INVENTION

Accordingly, what is needed is an electrical device cover that overcomes the drawbacks of conventional non-convertible covers, such as the inability of safely protecting electrical devices in varying orientations and in a variety of styles and sizes, through a cover that may interchangeably and safely accommodate virtually all commonly encountered electrical devices used in conjunction with electrical device boxes. The invention has the advantage of being able to solve these problems through a convertible electrical device cover that is adaptable to safely accommodate a plurality of electrical devices in a plurality of orientations.

The convertible electrical device cover includes a base plate configured to safely accommodate an electrical device. The base plate may further include at least one removable tab that, upon removal, allows conversion into or formation of at least one access opening that is configured to accommodate at least one electrical device. In an embodiment, the base plate may include a pair of removable tabs that, upon removal, allow conversion into or formation of a pair of access openings for receiving a duplex electrical outlet. A removable center tab that separates the pair of access openings, as well as four corner tabs, may also be included in the embodiment. The center and corner tabs may be removed to form an access opening for receiving a ground fault current interrupter outlet. Additionally, a pair of flanking tabs forming portions of the pair of access openings may be included as well in the embodiment, which may also be removed to form a larger access opening. Therefore, the base plate may be a "blank" comprising a continuous network of removable tabs, the removal of which may convert the base plate to accommodate a plurality of electrical devices.

The convertible electrical device cover also includes an adapter plate configured to safely accommodate an electrical device. The adapter plate may be located between the electrical device and a rear side of the base plate when the convertible electrical device cover is placed in an operative position over the electrical device. Alternatively, the base plate may be located between the electrical device and a rear side of the adapter plate when the convertible electrical device cover is placed in an operative position over the electrical device. In either of these alternative embodiments, a front face of the electrical device may be at least flush with a front side of the adapter plate, thereby ensuring a safer operating condition. In another embodiment, the adapter plate may be configured to abut the base plate on all sides of a larger access opening formed by removal of the pair of removable tabs and the center, corner, and flanking removable tabs of the exemplary base plate embodiment generally described above.

The adapter plate may further include at least one removable tab that, upon removal, allows conversion into or formation of at least one access opening that is configured to accommodate at least one electrical device. In an embodiment, the adapter plate may include features similar to the pair of removable tabs and the removable center, corner, and flanking tabs of the exemplary base plate embodiment generally described above. In another adapter plate embodiment, the adapter plate may include a removable tab that, upon removal, allows conversion into or formation of an access opening configured to accommodate a toggle switch. A substantially circular removable tab defining the access opening may also be included in the embodiment. The substantially circular removable tab may be removed to form a substantially circular access opening for receiving a round outlet. A substantially annular removable tab encompassing the substantially circular removable tab may be included as well in the embodiment, which may be removed to form a larger substantially circular access opening for receiving a larger round outlet. Therefore, the adapter plate may be a "blank" comprising a continuous network of removable tabs, the removal of which may convert the adapter plate to accommodate a plurality of electrical devices.

The convertible electrical device cover may further include an engaging mechanism. When a convertible electrical device cover is placed in an operative position over an electrical device, the engaging mechanism may be configured to either removably couple a front side of the adapter plate to a rear side of the base plate facing the electrical device, or removably couple a rear side of the adapter plate to a front side of the base plate, so that a front face of the electrical device may be held in at least a flush engagement with the front side of the adapter plate. The engaging mechanism may also be configured to position the adapter plate to accommodate an electrical device positioned in a plurality of orientations.

In another embodiment, the engaging mechanism may include opposing protrusions on a rear side of the base plate facing the electrical device, the opposing protrusions defining receiving notches positioned inwardly toward one another. Pins may also be provided that may be removably coupled to and extend outwardly from opposing sides of the adapter plate, the pins configured to removably couple into the receiving notches defined in the opposing protrusions so that a front side of the adapter plate may be removably coupled to a rear side of the base plate and a front face of the electrical device may be held in at least a flush engagement with the front side of the adapter plate.

In yet another embodiment, the engaging mechanism may include a recess. The recess may be defined in a rear side of a base plate facing an electrical device so that a front side of an adapter plate may be removably coupled into the recess, thereby holding a front face of the electrical device in at least a flush engagement with the front side of an adapter plate. Alternatively, the recess may be defined in a front side of a base plate so that a rear side of an adapter plate may be removably coupled into the recess and a front face of the electrical device may be held in at least a flush engagement with the front side of an adapter plate.

In still another embodiment, the engaging mechanism may include electrical device box screws and opposing top and bottom key holes that extend fully through the adapter plate and that align with underlying opposing top and bottom key holes in the base plate. The electrical device box screws may extend through the key holes in both the adapter and base plates and into the electrical device box screws holes so that a rear side of the adapter plate may be removably coupled to a front side of the base plate and a front face of the electrical device may be held in at least a flush engagement with the front side of the adapter plate.

The invention also includes a method for installing a convertible electrical device cover according to the present invention. Generally, the installation method may include the step of placing the convertible electrical device cover in an operative position over an electrical device so as to locate an adapter plate between the electrical device and a rear side of a base plate. Alternatively, the installation method may include the steps of: removing at least one removable tab of a base plate that is configured to accommodate at least one electrical device, thereby converting the base plate to accommodate at least one electrical device; removing at least one removable tab of an adapter plate that is configured to accommodate at least one electrical device, thereby converting the adapter plate to accommodate the at least one electrical device; and placing the convertible electrical device cover in an operative position over an electrical device so as to locate a base plate between the electrical device and a rear side of an adapter plate. In either of these alternative installation method embodiments, a front face of the electrical device may be at least flush with a front side of the adapter plate, thereby ensuring a safer operating condition.

The alternative installation method embodiments may further include the steps of: either utilizing an engaging mechanism to removably couple a front side of an adapter plate to a rear side of a base plate facing the electrical device, or utilizing an engaging mechanism to removably couple a rear side of an adapter plate to a front side of a base plate, so that a front face of the electrical device may be held in at least a flush engagement with the front side of the adapter plate; and/or utilizing an engaging mechanism to position an adapter plate to accommodate a plurality of orientations of an electrical device.

The foregoing and other features and advantages of the invention will be apparent from the following more particular description of embodiments of the invention, as illustrated in the accompanying drawings.

BRIEF DESCRIPTION OF THE DRAWINGS

The present invention and embodiments will hereinafter be described in conjunction with the appended drawings, where like designations denote like elements, and.

DESCRIPTION OF THE INVENTION

Generally, a convertible electrical device cover adaptable to safely accommodate a plurality of electrical devices in a plurality of orientations is provided. The convertible electrical device cover may interchangeably, yet safely, accommodate virtually all commonly encountered styles and sizes of electrical devices used in conjunction with electrical device boxes. The convertible electrical device cover includes a base plate and an adapter plate, both configured to safely accommodate an electrical device. When the convertible electrical device cover is placed in an operative position over the electrical device, either the adapter plate may be located between the electrical device and a rear side of the base plate facing the electrical device, or the base plate may be located between an electrical device and a rear side of the adapter plate, so that a front face of the electrical device may be at least flush with a front side of the adapter plate.

Referring to FIGS. 1–2, 4, and 6–13 specifically, convertible electrical device cover 100 includes base plate 110 with front and rear sides that is configured to safely accommodate an electrical device. Base plate 110 may be generally substantially rectangular (e.g. base plate 110 of FIGS. 1, 4, 6–13 for a single-gang electrical device configuration) or substantially square (e.g. base plate 110 of FIG. 2 for a two-gang electrical device configuration). However, other polygonal, circular, and the like base plate 150 shapes are within the scope of this invention.

Base plate 110 may further include at least one removable tab that, upon removal, allows conversion into or formation of at least one access opening that is configured to accommodate at least one electrical device. Thus, base plate 110 may be a "blank" comprising a continuous network of removable tabs, the removal of which may convert base plate 110 to accommodate a plurality of electrical devices. Alternatively, base plate 110 may include at least one access opening that is configured to safely accommodate at least one electrical device. In either of these alternative embodiments, the at least one access opening of base plate 110 may be generally substantially rectangular or substantially square, although other polygonal, circular, and the like shapes are within the scope of this invention, and the at least one access opening may be of sufficient size to accommodate one or more electrical devices in a plurality of styles and orientations. For example, base plate 110 with the at least one access opening may be configured to accommodate at least two electrical devices, such as in the two-gang electrical device configuration of convertible electrical device cover 200 in FIG. 2.

Figure 4:
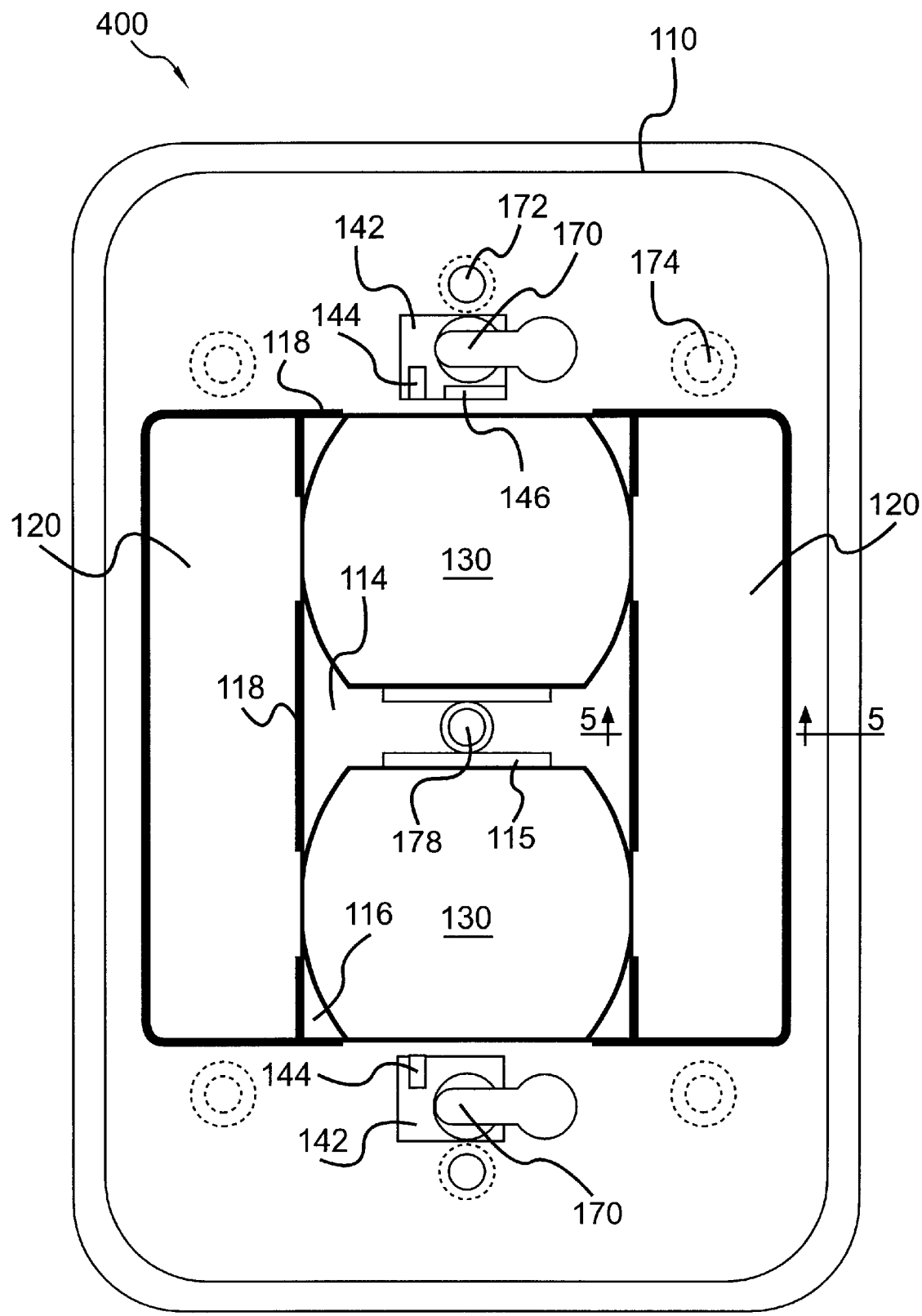
FIG. 4 is a rear view of a base plate of the present invention.
Figure 6:
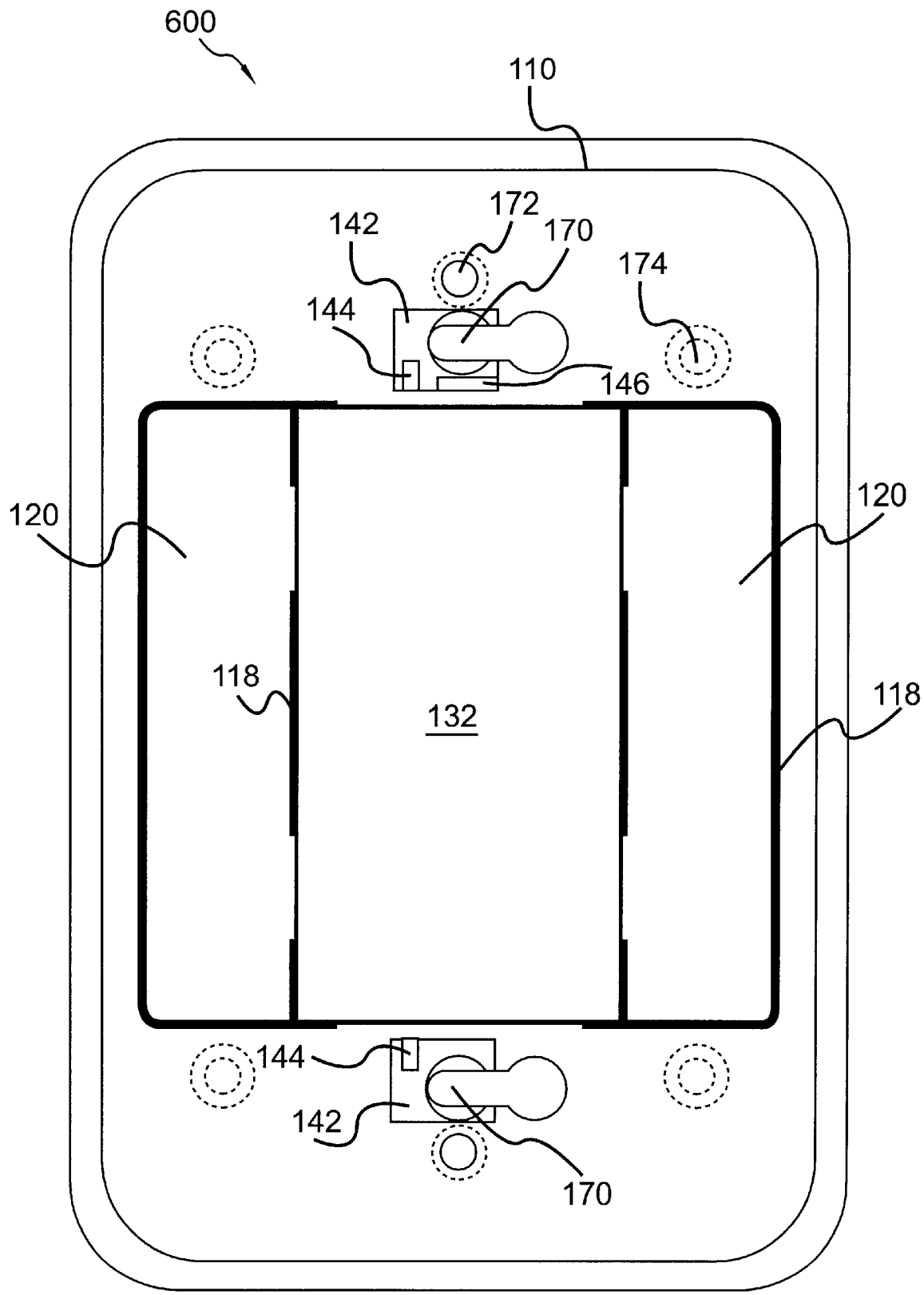
FIG. 6 is a rear view of a base plate of the present invention.
Figure 7:
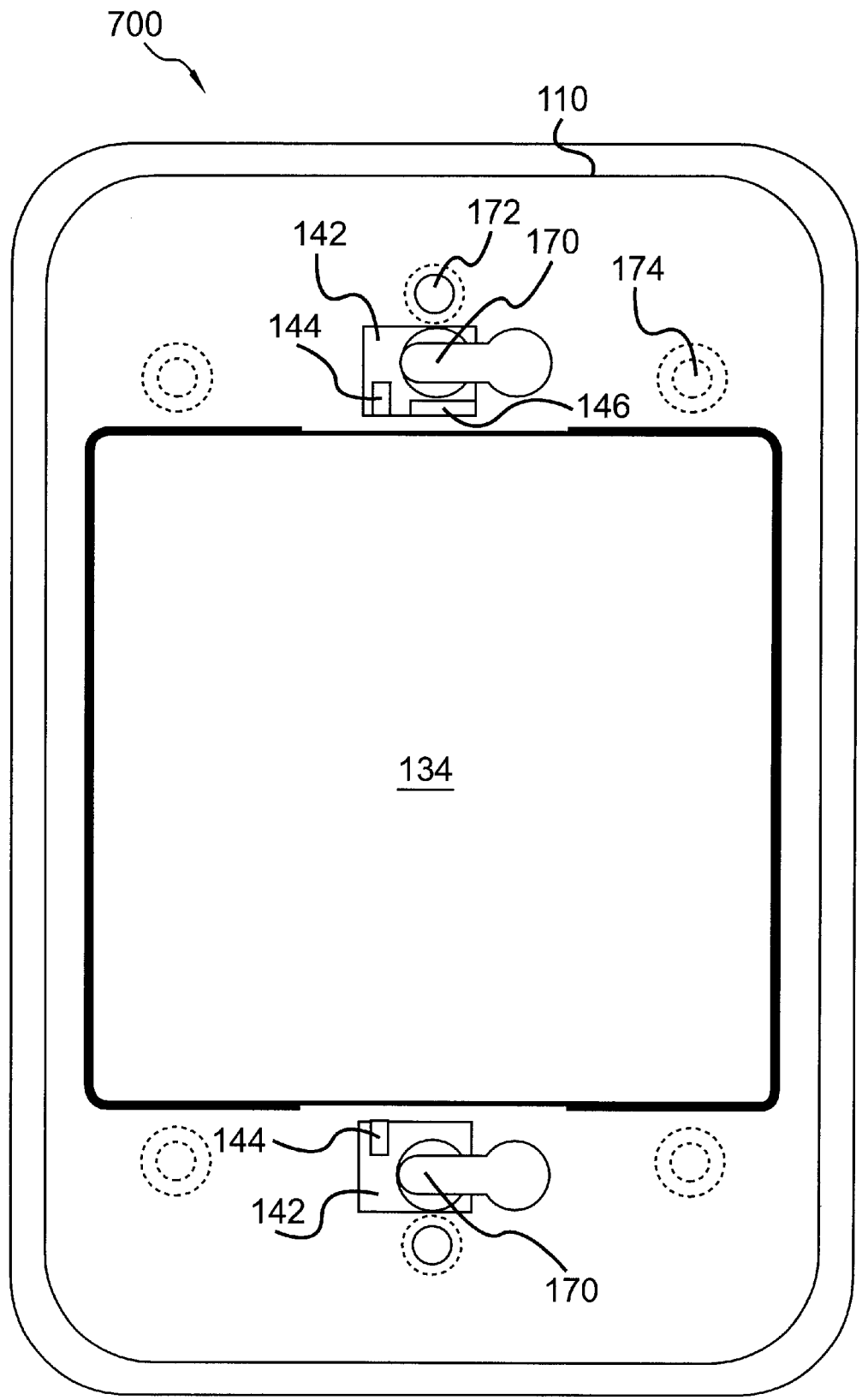
FIG. 7 is a rear view of a base plate of the present invention.

Turning to FIGS. 4, 6, and 7, base plate configurations 400, 600, and 700 illustrate an embodiment of base plate 110. Referring to base plate configuration 400 in FIG. 4, base plate 110 may include a pair of removable tabs (not shown) that, upon removal, allow conversion into or formation of a pair of access openings 130 for receiving a duplex electrical outlet for example. Alternatively, base plate 110 may already include access openings 130 for receiving a duplex electrical outlet. Removable center tab 114 separating and forming portions of access openings 130 may be included, along with removable corner tabs 116 also forming portions of access openings 130. Additionally, removable flanking tabs 120, also forming portions of access openings 130, may be included as well. As depicted in base plate configuration 600 in FIG. 6, removable center tab 114 and removable corner tabs 116 may be removed along grooves 118 as desired to form access opening 132 for receiving a ground fault circuit interrupter (GFCI) outlet for example. Removable flanking tabs 120 may also be removed along grooves 118 to form larger access opening 134 for receiving adapter plate 150, as depicted in base plate configuration 700 in FIG. 7.

Not withstanding the foregoing, many other combinations of removable tabs may be defined by base plate 110 according to the present invention, the removal of which may convert base plate 110 to accommodate a plurality of electrical devices. For example, base plate 110 may include removable tabs that yield access openings to receive a rocker-type light switch, a modular phone jack, a cable television outlet, or other electrical device. Additionally, the present invention may provide base plate 110 to be extremely versatile, such as in the co-pending patent application to Shotey et al. entitled "UNIVERSAL COVER PLATE," Ser. No. 09/657,352, filed Sep. 7, 2000, which is incorporated herein by reference. Thus, base plate 110 may include sets of removable tabs that are configured to form access openings to receive a variety of electrical devices. The tab sets are bounded by tab set periphery lines that may intersect each other, and the resulting access openings are bounded by access opening periphery lines that may intersect each other. Tab sets and potential access openings may overlap or they may include other tab sets or potential access openings. Also, any of several different combinations of the tab sets described in the previously incorporated reference may be provided within base plate 110. Thus, for example, a top duplex tab set, a bottom duplex tab set, a light switch tab set, a small single round tab set, a larger single round tab set, and a GFCI tab set may all be provided together within base plate 110. Thus, the present invention may provide a large variety of possible base plate 110 configurations without requiring a user to stock several different electrical device covers.

Figure 5:
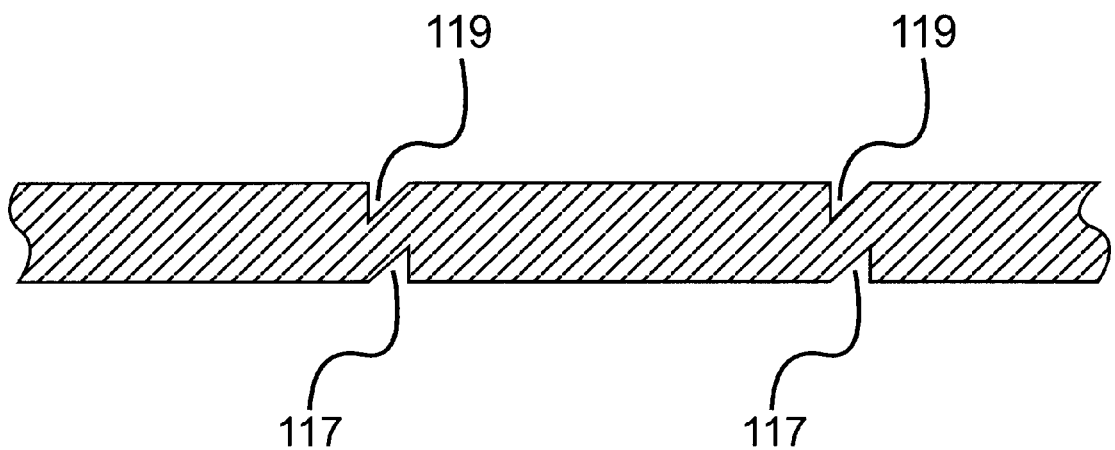
FIG. 5 is a sectional view taken along line 5—5 of FIG. 4.
Figure 3:
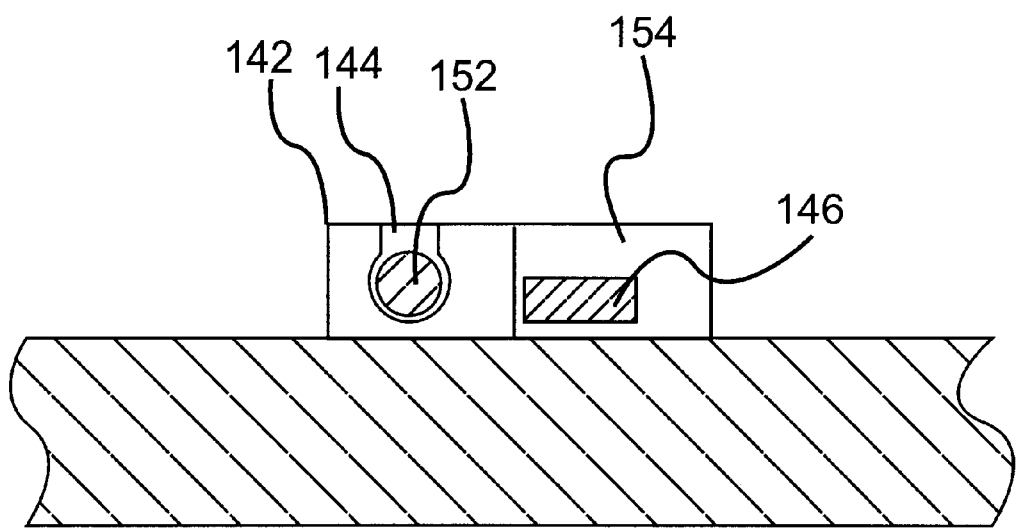
FIG. 3 is a sectional view taken along line 3—3 of FIG. 1.

In FIGS. 4 and 6, the pair of removable tabs (not shown) and removable tabs 114, 116, and 120 are connected to base plate 110 by grooves 118 (shown by dark lines). Grooves 118 define the pair of removable tabs (not shown) and removable tabs 114, 116, and 120 since removal of the pair of removable tabs (not shown) and tabs 114, 116, and 120 may be accomplished by breaking the material along grooves 118. By application of impact force, prying, or the like to a location anywhere within or adjacent to grooves 118, the pair of removable tabs (not shown) and removable tabs 114, 116, and 120 may be removed as desired. The dimensions and shape of grooves 118 may vary depending on the material used for the pair of removable tabs (not shown) and tabs 114, 116, and 120 and base plate 110. For example, referring to FIG. 5, if base plate 110, the pair of removable tabs (not shown), and tabs 114, 116, and 120 are made from a polymer such as polycarbonate, grooves 118 may include front grooves 117 extending inwardly from the front side of base plate 110 and an opposing rear groove 119 extending inwardly from the rear side of base plate 110. Alternatively, the pair of removable tabs (not shown) and removable tabs 114, 116, and 120 may be connected by connecting tabs or snap-in connections for example in place of grooves 118.

Referring to FIGS. 1, 2, 4, 6, 7, 8, and 10–13, base plate 110 defines various holes for receiving mounting screws that may be utilized to facilitate placing convertible electrical device cover 100 in an operative position over the electrical device. Different holes may be used depending on the configuration of the holes to which base plate 110 will be secured. Mounting holes are generally sized and configured to conform to the standards for electrical devices and boxes. Each of these alternate mounting access openings are provided for user convenience and to provide a high degree of latitude in the way base plate 110 may be attached to electrical devices. One or more of the mounting options may be used at any given time, with the goal being to provide the user with a maximum of convenience and choice. Any combination of the mounting holes mentioned in this paragraph or below may be included or excluded from a particular embodiment of the invention without departing from the invention's scope.

Therefore, base plate 110 may define top and bottom key holes 170. Each key hole 170 may include a head hole that extends fully through base plate 110. The head hole may be sized to receive a head of a fastener such as mounting screw 196 of FIG. 8. A shank slot also extends fully through base plate 110 and extends to the side from the head hole. The shank slot may be sized so that it may receive a shank of a fastener such as mounting screw 196 of FIG. 8, but so that it cannot receive the head thereof. The shank slot may be bounded on either side by a shoulder.

Figure 8:
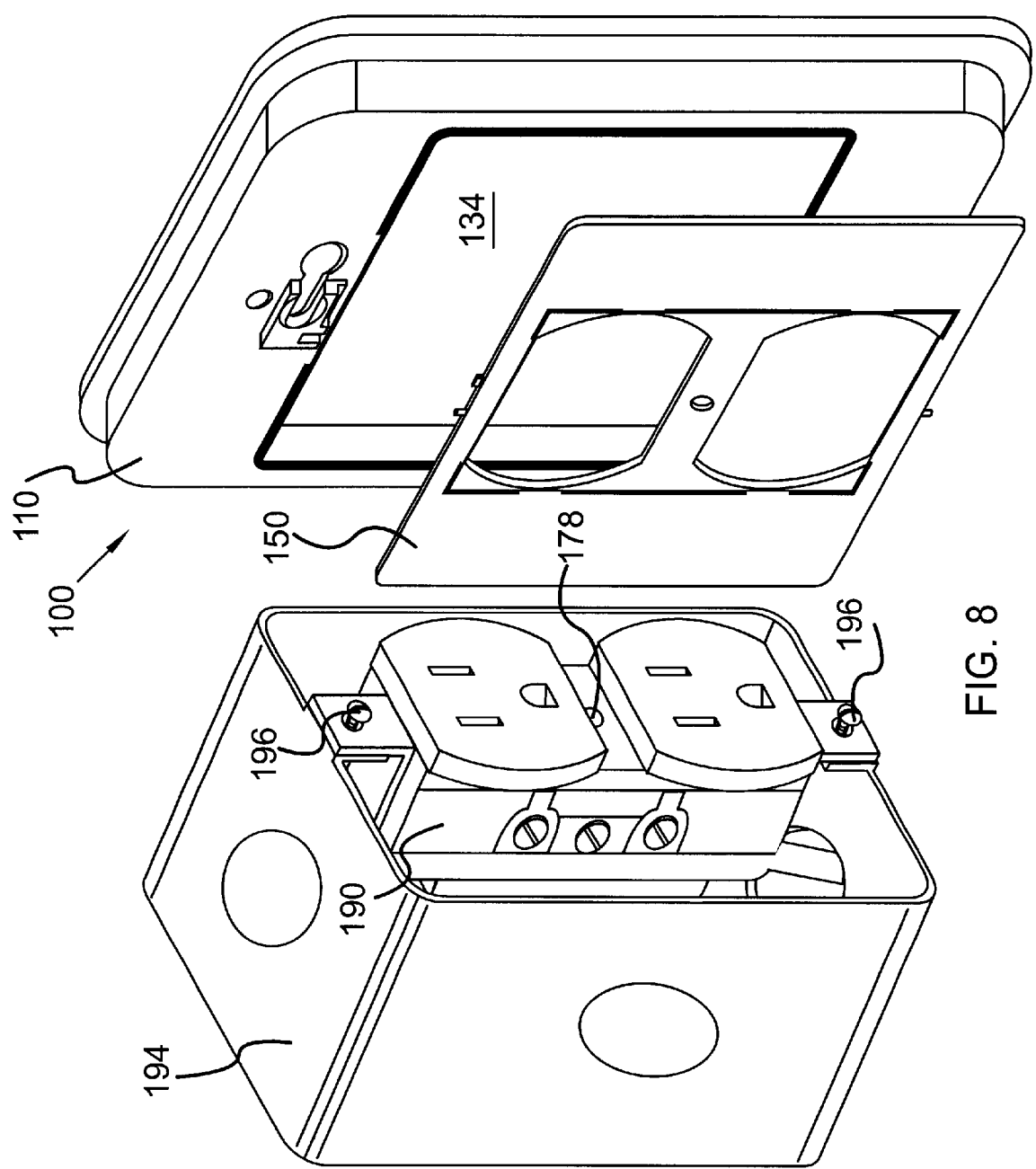
FIG. 8 is perspective view illustrating the placement of an adapter plate, with respect to an electrical device and a base plate, when a convertible electrical device cover of the present invention is to be placed in an operative position over the electrical device.

Referring to FIG. 8, key holes 170 may be used so that mounting screw 196 or other fastener may be partially turned into each electrical device box hole. Base plate 110 may then be oriented so that each head hole of each key hole 170 may be aligned with a corresponding mounting screw 196 head. Base plate 110 may then be pushed toward the electrical device box holes so that each mounting screw 196 head extends through a corresponding head hole. Base plate 110 may then be slid to the left so that each shank slot receives the shank of the corresponding mounting screw 196. Each mounting screw 196 may then be turned farther into the electrical device box hole until the head of mounting screw 196 snugly abuts the shoulder of the corresponding key hole 170. Base plate 110 may be easily removed by partially loosening each mounting screw 196, sliding base plate 110 to the right so that the head of each mounting screw 196 aligns with the corresponding head hole, and removing base plate 110 so that each mounting screw 196 head slides through a corresponding head hole. Thus, by using key holes 170, base plate 110 may be mounted and removed without fully removing the mounting screws 196 from the electrical device box holes.

Base plate 110 also may define box screw hole tabs 174. Box screw hole tabs 174 may comprise thinned areas of base plate 110 and may be located on a line parallel to the shorter sides of base plate 110 and approximately passing through key holes 170. Thus, box screw hole tabs 174 may be located one on either side of keyhole 170 and substantially equidistant from a head hole of key hole 170. If base plate 110 has two key holes 170, a pair of box screw hole tabs 174 will preferentially be located one on either side of both key holes 170, producing the configurations shown. The thickness of base plate 110 at box screw hole tabs 174 may be approximately half or a quarter of its thickness elsewhere, making it possible to use a sharp instrument such as a nail to punch through the material of base plate 110 at the location of box screw hole tabs 174, thus creating box screw mounting holes at each location.

Different device screw holes may be utilized depending on the configuration of base plate 110. Thus, removable center tab 114 of base plate 110 may define center mounting screw hole 178 in the duplex configuration of base plate 110 in FIGS. 2, 4, 8, 10–13, which also may be bordered by protrusions 115 (as depicted in FIG. 4) that prevent base plate from warping when a screw is used with center mounting screw hole 178. GFCI mounting holes 172 may be used to mount base plate 110 on a GFCI outlet. GFCI mounting holes 172 may be centered substantially on the longitudinal axis of base plate 110 adjacent to key holes 170. Other configurations of mounting holes may also be used with base plate 110 of the present invention.

Referring to FIGS. 1–2 and 8–13 specifically, convertible electrical device cover 100 includes adapter plate 150 with front and rear sides that is configured to safely accommodate an electrical device. Adapter plate 150 may be substantially rectangular (e.g. adapter plate 150 of FIGS. 2 and 12 for a two-gang electrical device configuration and a single-gang electrical device configuration respectively) or substantially square (e.g. adapter plate 150 of FIGS. 1, 8, 10–11, and 13 for a single-gang electrical device configuration). However, other polygonal, circular, and the like adapter plate 150 shapes are within the scope of this invention.

Adapter plate 150 may further include at least one removable tab that, upon removal, allows conversion into or formation of at least one access opening that is configured to accommodate at least one electrical device. Thus, adapter plate 150 may be a "blank" comprising a continuous network of removable tabs, the removal of which may convert adapter plate 150 to accommodate a plurality of electrical devices. Alternatively, adapter plate 150 may include at least one access opening that is configured to safely accommodate at least one electrical device. In either of these alternative embodiments, the at least one access opening of adapter plate 110 may be generally substantially rectangular or substantially square, although other polygonal, circular, and the like shapes are within the scope of this invention, and the at least one access opening may be of sufficient size to accommodate one or more electrical devices in a plurality of styles and orientations. For example, adapter plate 150 with the at least one access opening may be configured to accommodate at least two electrical devices, such as in the two-gang electrical device configuration of convertible electrical device cover 200 in FIG. 2.

In another embodiment of the invention, adapter plate 150 may be configured to abut base plate 110 of FIGS. 7–8 on all sides of larger access opening 134 formed by removal of the pair of removable tabs and center, corner, and flanking removable tabs 114, 116, and 120 respectively along grooves 118. However, adapter plate 150 may be utilized with any base plate 110 access opening configuration. For example, adapter plate 150 may also be used with base plate portion 600 of FIG. 6 as well.

Turning to FIGS. 1, 2, 8, and 10–13, adapter plate 150 configurations illustrate various embodiments of adapter plate 150. Referring to FIGS. 2, 8, and 10–13, an embodiment of adapter plate 150 may include a pair of removable tabs (not shown) that, upon removal, allow conversion into or formation of pair of access openings 130 for receiving a duplex electrical outlet for example. Alternatively, an embodiment of adapter plate 150 may already include access openings 130 for receiving a duplex electrical outlet. Removable center tab 114 separating and forming portions of access openings 130 may be included, along with removable corner tabs 116 also forming portions of access openings 130. Removable center tab 114 and removable corner tabs 116 may be removed along grooves 118 as desired to form access opening 132 for receiving a GFCI outlet.

In FIGS. 2, 8, and 10–13, the pair of removable tabs (not shown) and removable tabs 114 and 116 are connected to adapter plate 150 by grooves 118 (shown by dark lines). Grooves 118 define the pair of removable tabs (not shown) and removable tabs 114 and 116 since removal of the pair of removable tabs (not shown) and removable tabs 114 and 116 may be accomplished by breaking the material along grooves 118. By application of impact force, prying, or the like to a location anywhere within or adjacent to grooves 118, the pair of removable tabs (not shown) and removable tabs 114 and 116 may be removed as desired. The dimensions and shape of grooves 118 may vary depending on the material used for adapter plate 150 and the pair of removable tabs (not shown) and tabs 114 and 116. Alternatively, the pair of removable tabs (not shown) and removable tabs 114 and 116 may be connected by connecting tabs or snap-in connections for example in place of grooves 118.

Figure 1:
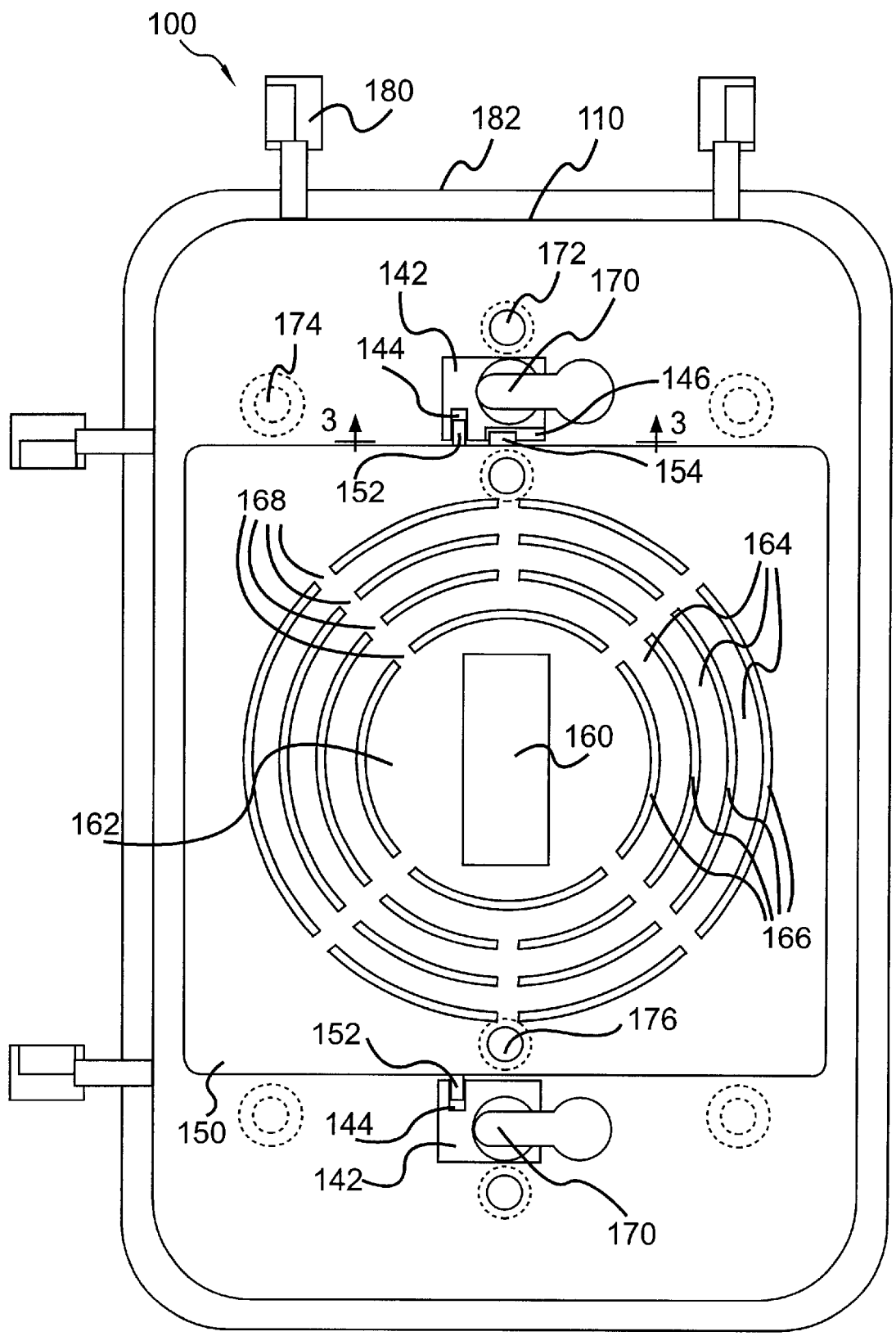
FIG. 1 is a rear view of a convertible electrical device cover of the present invention illustrating an adapter plate on a rear side of a base plate, the convertible electrical device cover for a single-gang electrical device configuration.
Figure 2:
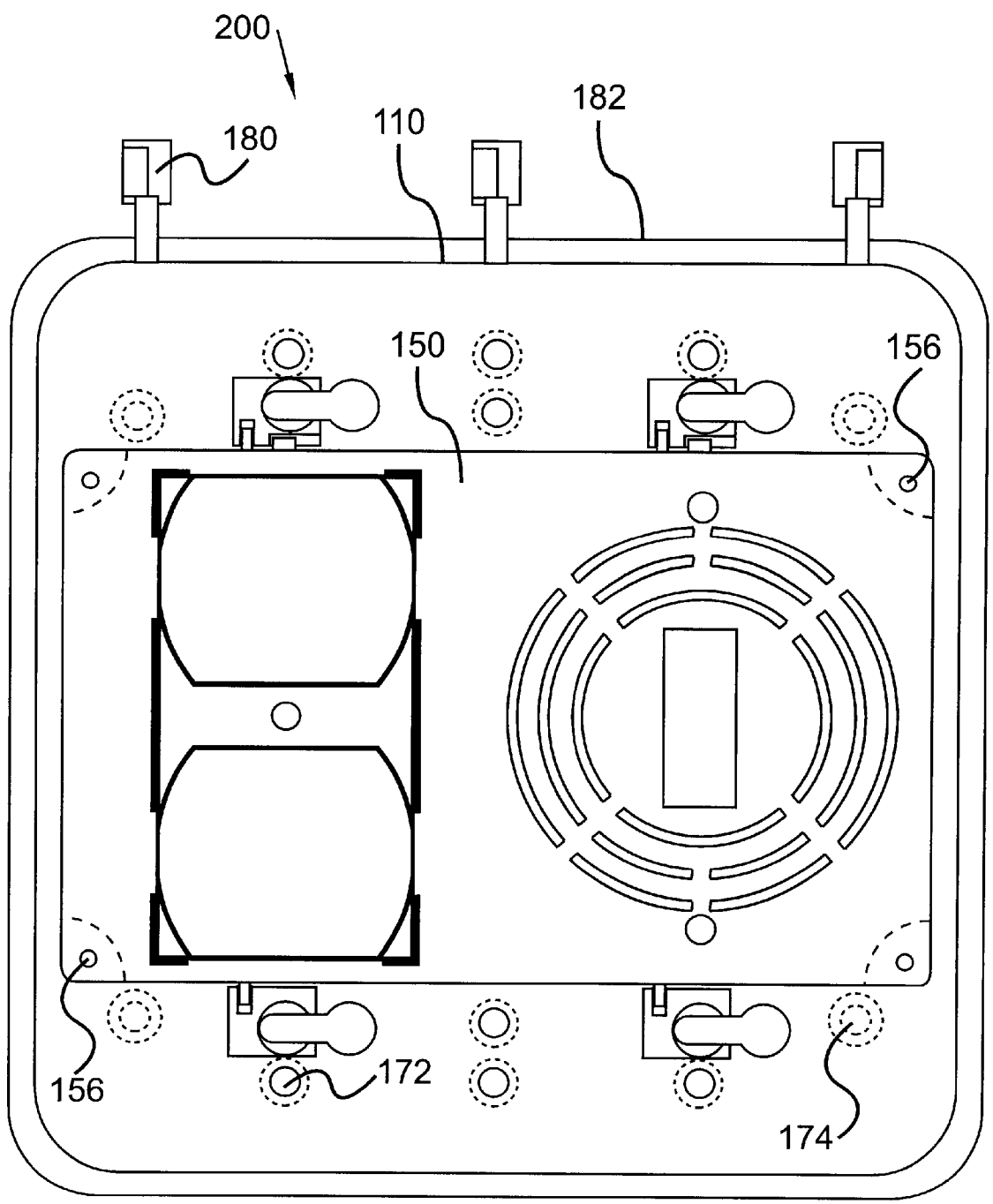
FIG. 2 is a rear view of a convertible electrical device cover of the present invention illustrating an adapter plate on a rear side of a base plate, the convertible electrical device cover for a two-gang electrical device configuration.

Referring to FIGS. 1 and 2, an embodiment of adapter plate 150 may include a removable tab that, upon removal, allows conversion into or formation of access opening 160 configured to accommodate a toggle switch for example. Alternatively, an embodiment of adapter plate 150 may already include access opening 160 configured to accommodate a toggle switch. Substantially circular removable tab 162 forming access opening 160 may also be included and may be removed along connecting tabs 168 to form a substantially circular access opening for receiving a round outlet for example. Substantially annular removable tabs 164 may encompass substantially circular removable tab 162. Substantially annular cut lines 166 successively separate substantially annular removable tabs 164 from one another and substantially circular removable tab 162. Substantially annular cut lines 166 may be apertures that extend through adapter plate 150. Substantially annular removable tabs 164 may be removed along connecting tabs 168 to form successively larger substantially circular access openings for receiving successively larger round outlets.

In FIGS. 1 and 2, removable tabs 162 and 164 are connected to adapter plate 150 by connecting tabs 168. Connecting tabs 168 define removable tabs 162 and 164 since removal of tabs 162 and 164 may be accomplished by breaking the material along connecting tabs 168. By application of impact force, prying, or the like to a location anywhere within or adjacent to connecting tabs 168, removable tabs 162 and 164 may be removed as desired. The dimensions and shape of connecting tabs 168 may vary depending on the material used for tabs 162 and 164 and adapter plate 150. Alternatively, removable tabs 162 and 164 may be connected by snap-in connections or grooves for example in place of connecting tabs 168.

Not withstanding the foregoing, many other combinations of removable tabs may be defined by adapter plate 150 according to the present invention, the removal of which may convert adapter plate 150 to accommodate a plurality of electrical devices. For example, adapter plate 150 may include removable tabs that yield access openings to receive a rocker-type light switch, a modular phone jack, a cable television outlet, or other electrical device. Additionally, the present invention may provide adapter plate 150 to be extremely versatile, such as in the co-pending patent application to Shotey et al. entitled "UNIVERSAL COVER PLATE," Ser. No. 09/657,352, filed Sep. 7, 2000, which is again incorporated herein by reference. Thus, according to this incorporated reference, adapter plate 150 may include sets of removable tabs that are configured to form access openings to receive a variety of electrical devices. The tab sets are bounded by tab set periphery lines that may intersect each other, and the resulting access openings are bounded by access opening periphery lines that may intersect each other. Tab sets and potential access openings may overlap or they may include other tab sets or potential access openings. Also, any of several different combinations of the tab sets described in the previously incorporated reference may be provided within adapter plate 150. Thus, for example, a top duplex tab set, a bottom duplex tab set, a light switch tab set, a small single round tab set, a larger single round tab set, and a GFCI tab set may all be provided together within adapter plate 150. Thus, the present invention may provide a large variety of possible adapter plate 150 configurations without requiring a user to stock several different electrical device covers.

Referring to FIGS. 1–2, 8, and 10–13, adapter plate 150 may define various holes for receiving mounting screws that may be utilized to facilitate placing convertible electrical device cover 100 in an operative position over the electrical device. Different holes may be used depending on the configuration of the holes to which adapter plate 150 will be secured. Mounting holes are generally sized and configured to conform to the standards for electrical devices. Each of these alternate mounting holes are provided for user convenience and to provide a high degree of latitude in the way adapter plate 150 may be attached to electrical devices. One or more of the mounting options may be used at any given time, with the goal being to provide the user with a maximum of convenience and choice. Any combination of the mounting holes mentioned in this paragraph or below may be included or excluded from a particular embodiment of the invention without departing from its scope.

Therefore, adapter plate 150 may define different device screw holes depending on the configuration of adapter plate 150. Thus, removable center tab 114 of adapter plate 150 may define center mounting screw hole 178 in the duplex configuration of adapter plate 150 in FIGS. 2 and 8–13. Adapter plate 150 may also define mounting screw holes 176 in the switch and round configurations of adapter plate 150 in FIGS. 1 and 2. Other configurations of mounting holes may also be used with adapter plate 150 of the present invention. Referring to FIG. 12 for example, adapter plate 150 may define top and bottom key holes 170, as previously described, that extend fully through adapter plate 150 and that align with underlying opposing top and bottom key holes 170 in base plate 110.

When convertible electrical device cover 100 is placed in an operative position over an electrical device, adapter plate 150 may be located between the electrical device and a rear side of base plate 110 facing the electrical device (e.g. FIGS. 8–9 and 10–11—but not showing the electrical device). Alternatively, when convertible electrical device cover 100 is placed in an operative position over the electrical device, base plate 110 may be located between the electrical device and a rear side of adapter plate 150 (e.g. FIGS. 12–13—but not showing the electrical device). In either of these embodiments, a front face of the electrical device may be at least flush with a front side of adapter plate 150 (e.g. FIG. 9), thereby ensuring a safer operating condition.

Moreover, turning now to FIGS. 1–4 and 6–13 generally, convertible electrical device cover 100 may also include an engaging mechanism. The engaging mechanism may be configured to position adapter plate 150 to accommodate an electrical device positioned in a plurality of orientations, such as a substantially vertical orientation and at least a substantially horizontal orientation for example. This allows a single adapter plate 150 to be used in either orientation and therefore, may be economical and efficient. It may be appreciated however that a similar advantage could be obtained by providing two separate adapter plates 150 that could be positioned in base plate 110 in only either the substantially vertical orientation or the substantially horizontal orientation. Thus, one of adapter plates 150 may have openings for a horizontally oriented electrical device and the other would have openings for a vertically oriented electrical device, but the same base plate 110 could be used. This would not be as advantageous, but it would provide the ability to accommodate both types of electrical device orientations with mostly the same components.

Still referring to FIGS. 1–4 and 6–13 generally, the engaging mechanism may further be configured to removably couple a front side of adapter plate 150 to a rear side of base plate 110 facing the electrical device. Alternatively, the engaging mechanism may further be configured to removably couple a rear side of adapter plate 150 to a front side of base plate 110. In either of these embodiments, a front face of the electrical device may be held in at least a flush engagement with the front side of adapter plate 150.

Figure 12:
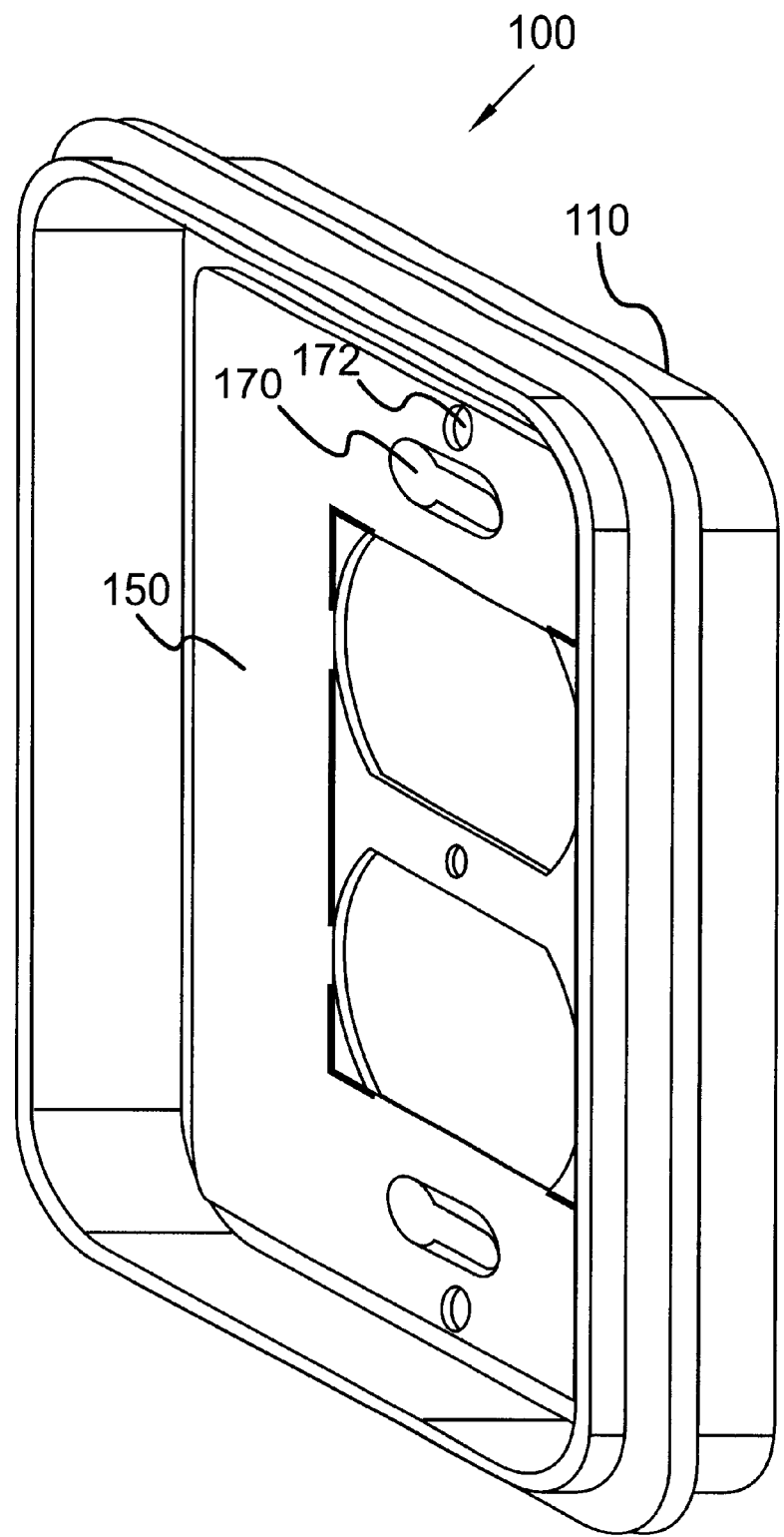
FIG. 12 is a front perspective view of a convertible electrical device cover of the present invention illustrating an adapter plate on a front side of a base plate.
Figure 13:
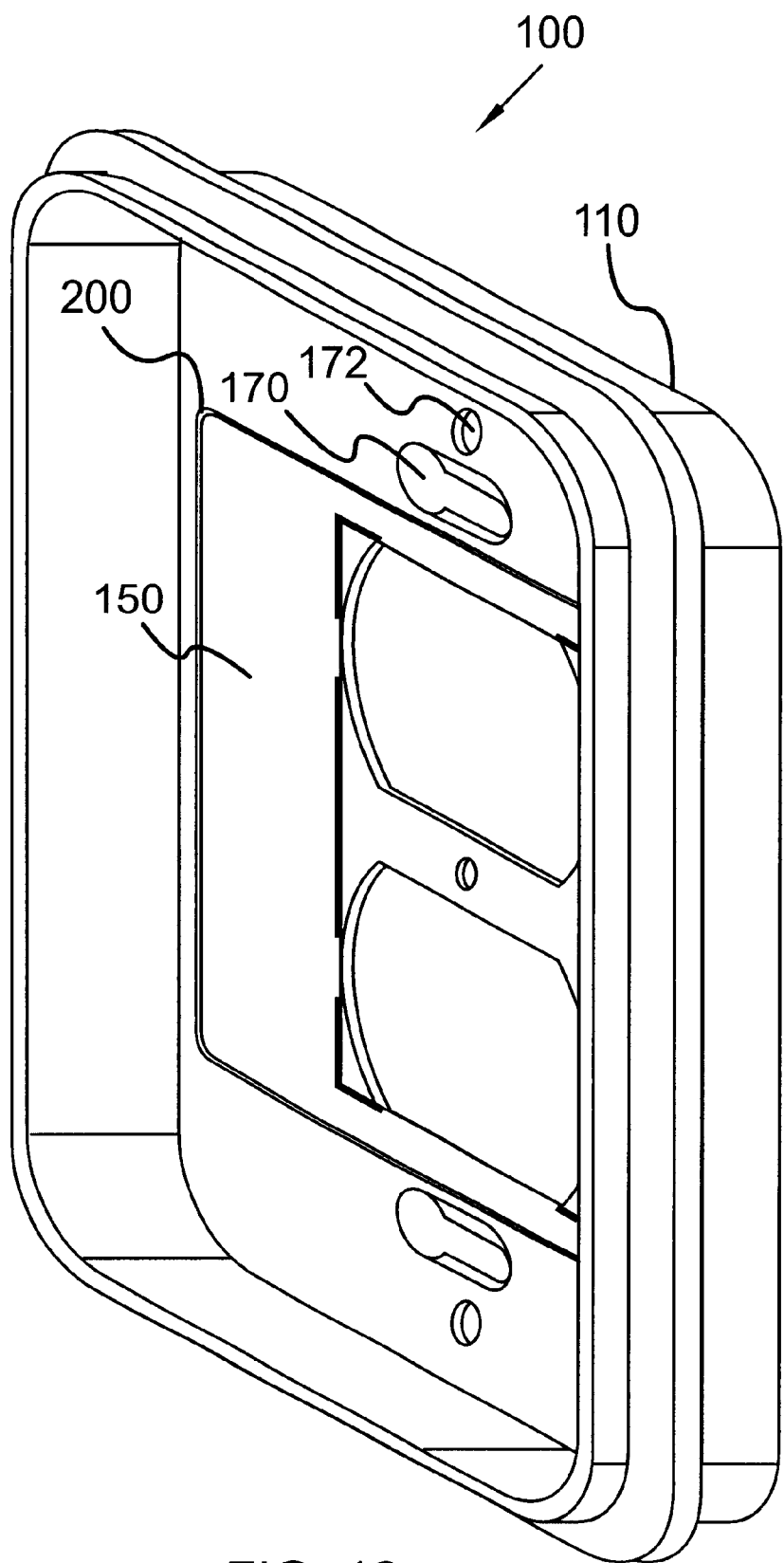
FIG. 13 is a front perspective view of a convertible electrical device cover of the present invention illustrating an adapter plate in a recess in a front side of a base plate.

Referring to FIGS. 12–13 specifically, one embodiment of an engaging mechanism that is configured to removably couple a rear side of adapter plate 150 to a front side of base plate 110 may comprise at least one electrical device screw and at least one electrical device screw hole extending through adapter plate 150, wherein the at least one electrical device screw removably couples adapter plate 150 to the electrical device, thereby squashing base plate 110 between the rear side of adapter plate 150 and the electrical device. For example, as depicted in FIGS. 12–13, the at least one electrical device screw and the at least one electrical device screw hole could include a duplex electrical outlet screw and a duplex electrical outlet screw hole 178. As another example, the at least one electrical device screw and the at least one electrical device screw hole could include at least two switch screws and at least two switch screw holes 176 as in FIGS. 1 and 2.

Referring to FIG. 12, another embodiment of an engaging mechanism that is configured to removably couple a rear side of adapter plate 150 to a front side of base plate 110 may comprise electrical device box mounting screws and opposing top and bottom key holes 170 that extend fully through adapter plate 150 and that align with underlying opposing top and bottom key holes 170 in base plate 110. Key holes 170 may be used so that a mounting screw or other fastener may be partially turned into each electrical device box hole. A rear side of adapter plate 150 may be removably coupled to a front side of base plate 110 in the following manner. Base plate 110 and adapter plate 150 may be oriented so that each head hole of each key hole 170 may be aligned with a corresponding mounting screw head. Base plate 110 and adapter plate 150 may then be pushed toward the electrical device box holes so that each mounting screw head extends through a corresponding head holes, and the process can continue in the same manner as described previously in conjunction with key holes 170 of base plate 110 and in reference to FIG. 8, thereby squashing base plate 110 between adapter plate 150 and the electrical device. Thus, by using key holes 170, base plate 110 and adapter plate 150 may not only be mounted and removed without fully removing the mounting screws 196 from the electrical device box holes, but a front face of the electrical device may be held in at least a flush engagement with the front side of adapter plate 150.

Referring to FIG. 2 specifically, an embodiment of an engaging mechanism that is configured to removably couple a front side of adapter plate 150 to a rear side of base plate 110 may comprise at least one electrical device screw, at least one electrical device screw hole extending through adapter plate 150, at least one adapter plate screw, and at least one adapter plate screw hole extending through adapter plate 150. The at least one electrical device screw removably couples adapter plate 150 to the electrical device and the at least one adapter plate screw removably couples adapter plate 150 to the rear side of base plate 110. As described previously, a first part of this engaging mechanism may include a duplex electrical outlet screw and a duplex electrical outlet screw hole 178 as in FIGS. 2, 8, and 10–13 and/or at least two switch screws and at least two switch screw holes 176 as in FIGS. 1 and 2. As the second part of this engaging mechanism, the at least one adapter plate screw hole may comprise adapter plate screw holes 156 in the corners of adapter plate 150 as in FIG. 2, and corresponding adapter plate screws could removably couple adapter plate 150 to corresponding underlying portions of the rear side of base plate 110 (depicted as dashed lines).

Referring to FIGS. 1–4 and 6–13, another embodiment of the engaging mechanism that is configured to removably couple a front side of adapter plate 150 to a rear side of base plate 110 may include opposing protrusions 142 on a rear side of base plate 110 extending outwardly to a predetermined height. The thickness of adapter plate 150 may be substantially the same as the predetermined height of opposing protrusions 142. When key holes 170 are utilized to mount base plate 110 to an electrical box, opposing protrusions 142 prevent base plate 110 from warping. Additionally, opposing protrusions 142 may define recesses in top sides of opposing protrusions 142. Such recesses also prevent base plate 110 from warping away from a flush engagement with the electrical box by receiving screw heads.

Specifically, opposing protrusions 142 defining receiving notches 144 positioned inwardly toward one another. Pins 152 may also be provided that may be removably coupled to and extend outwardly from opposing sides of adapter plate 150. Pins 152 are configured to removably couple into receiving notches 144 defined in opposing protrusions 142 so that a front side of adapter plate 150 may be removably coupled to a rear side of base plate 110 and a front face of the electrical device may be held in at least a flush engagement with a front side of adapter plate 150. Receiving notches 144 may be located off-center of a center line parallel to longer sides of base plate 110. Moreover, additional receiving notch 146 may be included, it being defined in one of opposing protrusions 142. Likewise, additional pin 154 may be included, additional pin 154 removably coupled to and extending outwardly from a side of adapter plate 150. Additional pin 154 may be configured to removably couple into additional receiving notch 146, thereby properly positioning adapter plate 150 relative to opposing protrusions 142.

Yet another embodiment of the engaging mechanism that is configured to removably couple a front side of adapter plate 150 to a rear side of base plate 110 may include at least two opposing rails on the rear side of base plate 110. Adapter plate 150 may be configured to be slidably removably coupled between the at least two opposing rails so that a front side of adapter plate 150 may be removably coupled to a rear side of base plate 110 and a front face of the electrical device may be held in at least a flush engagement with a front side of adapter plate 150.

Figure 11:
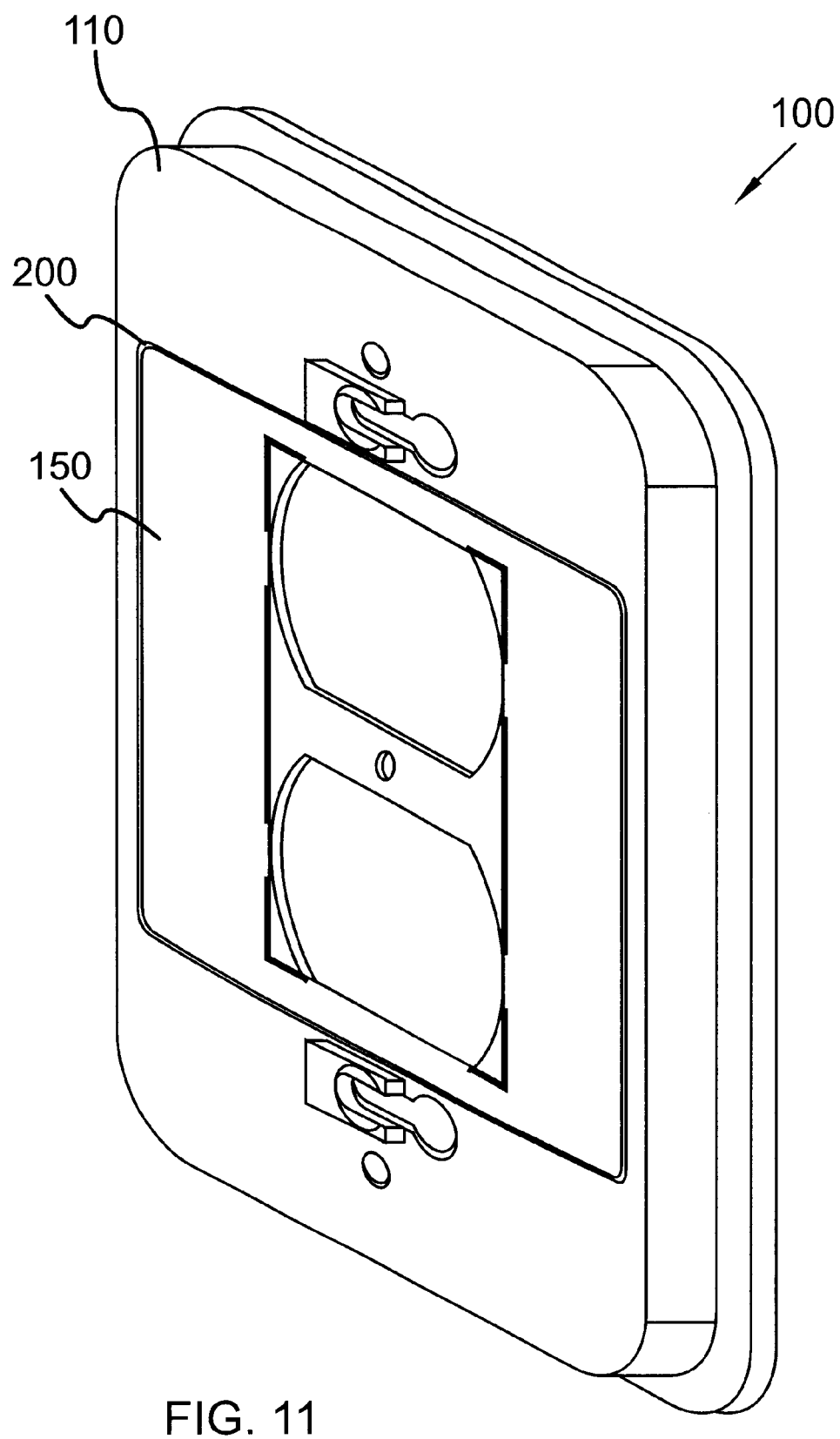
FIG. 11 is a rear perspective view of a convertible electrical device cover of the present invention illustrating an adapter plate in a recess in a rear side of a base plate.

Referring to FIGS. 11 and 13 specifically, an embodiment of the engaging mechanism that is configured to either removably couple a front side of adapter plate 150 to a rear side of base plate 110, or removably couple a rear side of adapter plate 150 to a front side of base plate 110, may include recess 200 configured to removably couple adapter plate 150. Recess 200 may be defined in a rear side of base plate 110 facing an electrical device so that a front side of adapter plate 150 may be removably coupled into recess 200 and a front face of the electrical device may be held in at least a flush engagement with the front side of adapter plate 150. Alternatively, recess 200 may be defined in a front side of base plate 110 so that a rear side of adapter plate 150 may be removably coupled into recess 200 and a front face of the electrical device may be held in at least a flush engagement with the front side of adapter plate 150.

As depicted in FIGS. 1 and 2 generally, convertible electrical device cover 100 may further include at least one removable hinge removably coupled to and extending outwardly from base plate 110. The at least one hinge may be configured to pivotally couple with at least one hinge of a protective housing. Useful to the present invention are the protective housings and hinges described in the patent to Shotey et al. entitled "UNIVERSAL COVER PLATE, COVER PLATE ASSEMBLY, AND RELATED METHODS," U.S. Pat. No. 5,763,831, and in the co-pending patent application to Shotey et al. entitled "UNI- VERSAL COVER PLATE," Ser. No. 09/657,352, filed Sep. 7, 2000, both of which are incorporated herein by reference.

As depicted in FIGS. 1 and 2 specifically, base plate 110 may include two pairs of hinges 180, one pair attached to a short side of base plate 110 and one pair attached to a long side of base plate 110. Hinges 180 are designed to adapt to a variety of situations depending on the direction in which the protective housing may be opened. For example, the protective housing may be rotated around an axis formed parallel to a short side of base plate 110. Were it more desirable to let the protective housing, when in its open position, rest at either side of base plate 110, rather than let it rest above base plate 110, the axis of rotation could be located parallel to a long side of base plate 110, and hinges 180 located on that side would be used. Hinges 180 are further designed to be removable, once the choice of rotational axis has been made, in the manners generally set forth in the previously incorporated references.

In practice, then, it would be typical for a user of the present invention to remove an unused pair of hinges and leave only that pair to which the protective cover may be to be attached. On the other hand, if there were a possibility that the protective cover configuration would change from time to time, raising the possibility of the alternate use of multiple pairs of hinges, each pair of hinges 180 could be left in place to serve as pivotal attachment locations when needed. Furthermore, it should be understood that the hinge configuration shown in FIGS. 1 and 2 are not the only possible configuration. Hinges 180 could be placed on any combination of the four long and short sides of base plate 110, singly or in pairs.

Convertible electrical device cover 110 may also include a protective housing, which may be particularly useful in outdoor settings where a weatherproof cover plate may be desired. Thus, the protective housing could provide an opening for the passage of a cord extending from a plug inserted into an electrical outlet, for example, such that the plug may remain in the outlet and the electrical device to which the other end of the plug and the cord are attached may remain in operation when the protective housing is in its closed position, thereby affording a degree of protection from the elements or other intrusions. The present invention may also provide a continuous flange 182 extending outwardly and continuously along a periphery of base plate 150 as depicted in FIGS. 1–2, 4, and 6–13. Flange 182 may be configured to accommodate the protective housing. That is, flange 182 may provide a seat for the protective housing when in an operative position over the base plate. However, if the protective housing is not desired the present invention may allow for base plate 110 without a protective housing. Therefore, all hinges 180 and flange 182 could be removed if a protective housing is not needed, or alternatively base plate 110 may be manufactured free of them.

Components of convertible electrical device cover 100 may be made from any of many different types of materials. For example, base plate 110 and adapter plate 150 may be made from weather-resistant, rigid, electrically non-conductive materials such as polycarbonate, polystyrene or other plastic materials known in the art. Base plate 110 and adapter plate 150 may also be made from corrosion-resistant metal, such as zinc, magnesium, or other metals known in the art. For example, aluminum may also be used, although aluminum is not particularly resistant to corrosion in a salt water environment. Notwithstanding, base plate 110 and adapter plate 150 may be made from other materials suitable for electrical applications. The components of convertible electrical device cover 100 may be manufactured separately and then assembled together. Base plate 110 and adapter plate 150 may be manufactured by injection molding, casting, milling, metal stamping, or the like. Base plate 110 and adapter plate 150 may then be assembled together through an installation method as described below when convertible electrical device cover 100 is placed in an operative position over the electrical device.

Figure 9:
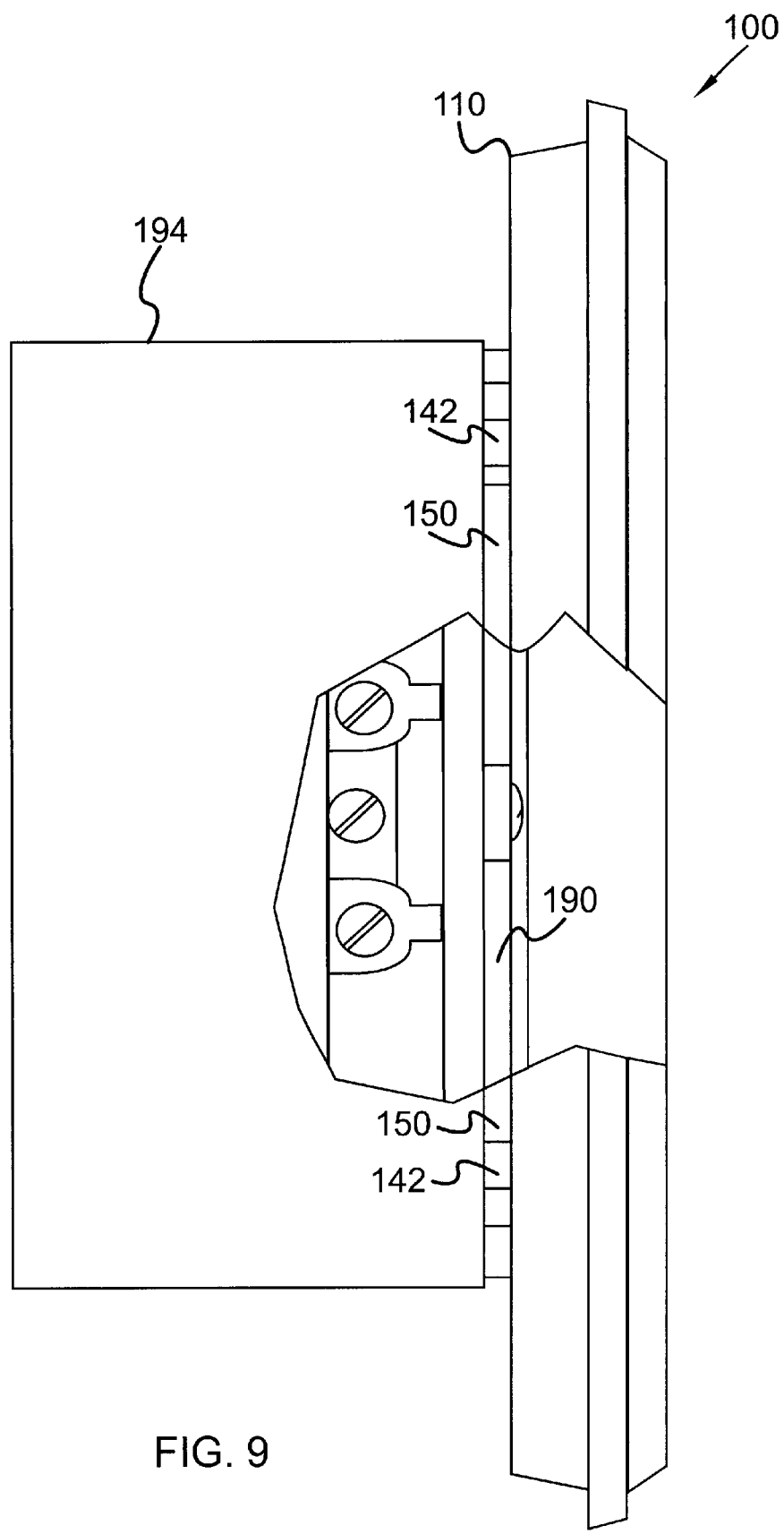
FIG. 9 is partially broken away side view of a convertible electrical device cover of the present invention placed in an operative position over an electrical device, thereby illustrating that a front face of the electrical device may protrude far enough to at least be flush with a front side of an adapter plate.
Figure 10:
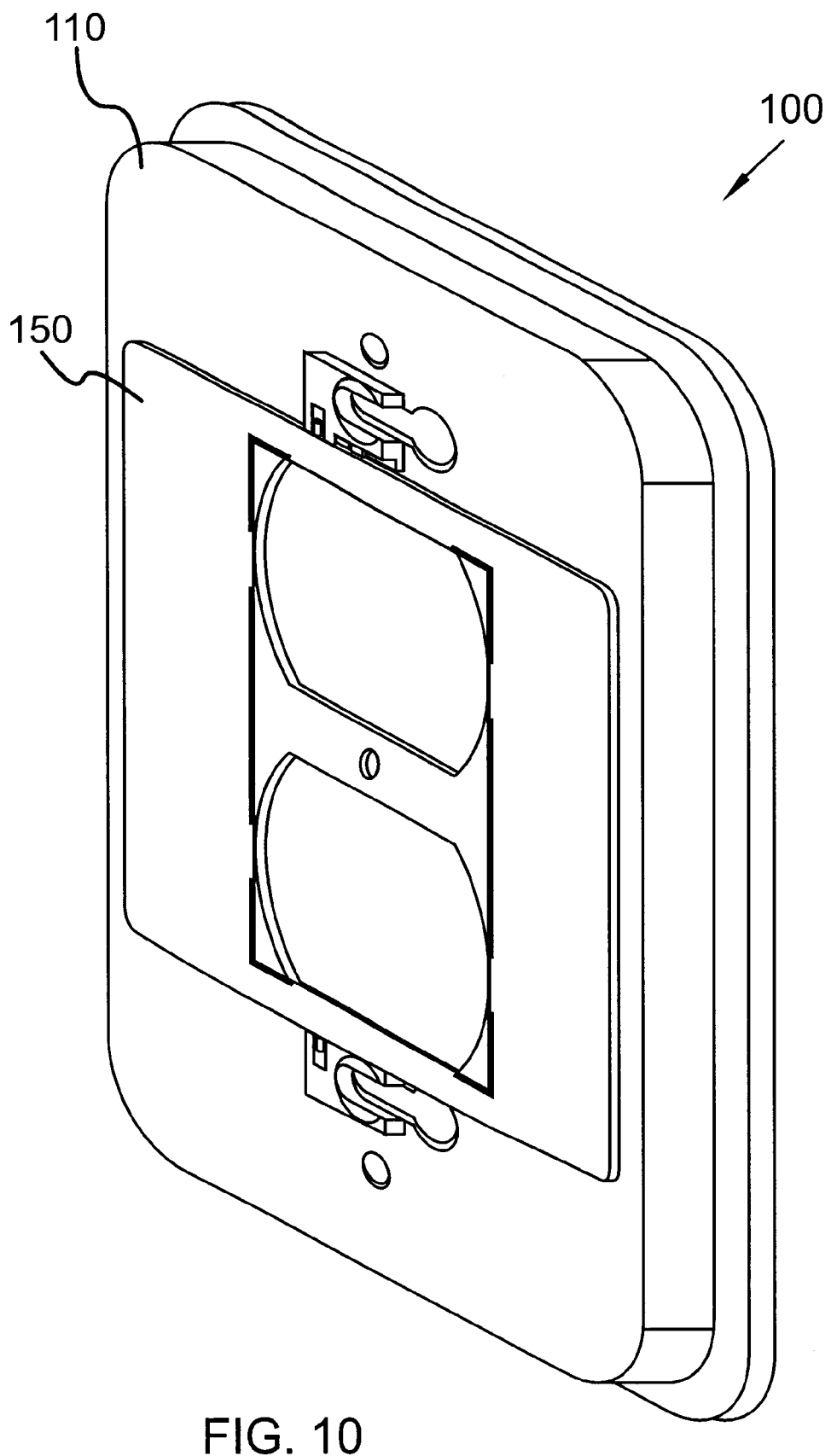
FIG. 10 is a rear perspective view of a convertible electrical device cover of the present invention illustrating an adapter plate on a rear side of a base plate.

Describing the installation and use of convertible electrical device cover 100 further, a method for installing convertible electrical device cover 100 may also be provided to safely accommodate a plurality of electrical devices in a plurality of orientations. As depicted in FIGS. 8–9 for example, a first embodiment of the installation method may include placing convertible electrical device cover 100 in an operative position over at least one electrical device so as to locate adapter plate 150 between the at least one electrical device and a rear side of base plate 110. As depicted in FIG. 9, placing the convertible electrical device cover 100 can further include holding at least one front face of the at least one electrical device at least flush with a front side of adapter plate 150, thereby ensuring a safer operating condition.

The first installation method embodiment may further include removing at least one removable tab of base plate 110, thereby converting base plate 110 to accommodate the at least one electrical device. Specifically, removing at least one removable tab of base plate 110 can include forming at least one access opening that is configured to accommodate the at least one electrical device. For example, as depicted in FIGS. 4 and 6, removing at least one removable tab of base plate 110 may include removing center removable tab 114 and corner removable tabs 116 forming part of access openings 130 that are configured to accommodate a duplex electrical outlet, thereby forming substantially rectangular access opening 132 that is configured to accommodate a GFCI outlet. Additionally, removing center removable tab 114 and corner removable tabs 116 may also include removing a pair of removable tabs, thereby forming access openings 130. Moreover, as depicted in FIGS. 4 and 6–7, removing center removable tab 114 and corner removable tabs 116 may also include removing flanking removable tabs 120 forming part of pair of access openings 130, thereby forming larger access opening. Then, as depicted in FIG. 8, the first installation method embodiment may further include abutting adapter plate 150 to base plate 110 on all sides of larger access opening 134.

The first installation method embodiment may still further include removing at least one removable tab of adapter plate 150, thereby converting adapter plate 150 to accommodate the at least one electrical device. Specifically, removing at least one removable tab of adapter plate 150 may include forming at least one access opening that is configured to accommodate the at least one electrical device. For example, removing at least one removable tab of adapter plate 150 may include removing center removable tab 114 and corner removable tabs 116 forming part of access openings 130 that are configured to accommodate a duplex electrical outlet (the various removable tabs and access openings depicted in FIGS. 2, 8, and 10–13), thereby forming substantially rectangular access opening 132 that is configured to accommodate a GFCI outlet. Additionally, removing center removable tab 114 and corner removable tabs 116 may also include removing a pair of removable tabs, thereby forming access openings 130.

As another example, removing at least one removable tab of adapter plate 150 may further include removing substantially circular removable tab 162 forming access opening 160 configured to accommodate a toggle switch (the removable tab and access opening depicted in FIGS. 1 and 2), thereby forming a substantially circular access opening that is configured to accommodate a round outlet. Additionally, removing substantially circular removable tab 162 may also include removing a removable tab, thereby forming access opening 160 that is configured to accommodate the toggle switch. Moreover, removing substantially circular removable tab 162 may further include removing at least one substantially annular removable tab 164 encompassing at least a portion of substantially circular removable tab 162 (the removable tabs depicted in FIGS. 1 and 2), thereby forming at least one larger substantially circular access opening that is configured to accommodate at least one larger round outlet.

The first installation method embodiment may further include the step of utilizing an engaging mechanism to removably couple a front side of adapter plate 150 to a rear side of base plate 110 so that adapter plate 150 is located between the at least one electrical device and the rear side of base plate 110 when convertible electrical device cover 100 is placed in an operative position over the at least one electrical device, and so that at least one front face of the at least one electrical device is held in at least a flush engagement with the front side of adapter plate 150. Additionally, the step of utilizing an engaging mechanism may further include positioning adapter plate 150 to accommodate the at least one electrical device positioned in a plurality of orientations.

As partially depicted in FIGS. 12–13, a second embodiment of the installation method may include: removing at least one removable tab of base plate 110 that is configured to accommodate at least one electrical device, thereby converting base plate 110 to accommodate the at least one electrical device; removing at least one removable tab of adapter plate 150 that is configured to accommodate at least one electrical device, thereby converting adapter plate 150 to accommodate the at least one electrical device; and placing convertible electrical device cover 100 in an operative position over at least one electrical device so as to locate base plate 110 between the at least one electrical device and a rear side of adapter plate 150. Placing the convertible electrical device cover 100 can further include holding at least one front face of the at least one electrical device at least flush with a front side of adapter plate 150, thereby ensuring compliance with current electrical safety standards.

Other than the just described distinctive steps, further possible steps of the second installation method embodiment are similar to the possible steps of the first installation method embodiment as described above, the above description incorporated herein by reference to describe the further possible steps of the second installation method embodiment. Therefore, only one other different possible step between the two installation method embodiments will be further described. Specifically, the second installation method embodiment may further include utilizing an engaging mechanism to removably couple a rear side of adapter plate 150 to a front side of base plate 110 so that base plate 110 is located between the at least one electrical device and the rear side of adapter plate 110 when convertible electrical device cover 100 is placed in an operative position over the at least one electrical device, and so that at least one front face of the at least one electrical device is held in at least a flush engagement with the front side of adapter plate 150.

While the invention has been particularly shown and described with reference to embodiments thereof, it will be understood by those skilled in the art that various changes in form and details may be made therein without departing from the spirit and scope of the invention. Accordingly, unless otherwise specified, any components of the convertible electrical device cover according to the present invention indicated in the drawings or herein are given as an example of possible components and not as a limitation. Similarly, unless otherwise specified, any steps or sequence of steps of the installation methods according to the present invention indicated herein are given as examples of possible steps or sequence of steps and not as limitations.

What is claimed is:

1. A convertible electrical device cover comprising:
a base plate comprising front and rear sides, the base plate configured to accommodate at least one electrical device;
an adapter plate comprising front and rear sides, the adapter plate configured to accommodate the at least one electrical device; and
an engaging mechanism that is configured to removably couple the adapter plate to the rear side of the base plate so that the adapter plate is located between the at least one electrical device and the rear side of the base plate when the convertible electrical device cover is placed in an operative position over the at least one electrical device, and so that at least one front face of the at least one electrical device is held in at least a flush engagement with the front side of the adapter plate.

2. The convertible electrical device cover of claim 1, wherein the base plate further comprises at least one removable tab that, upon removal, converts the base plate to accommodate the at least one electrical device.

3. The convertible electrical device cover of claim 2, wherein removal of the at least one removable tab allows conversion into at least one access opening that is configured to accommodate the at least one electrical device.

4. The convertible electrical device cover of claim 1, wherein the adapter plate further comprises at least one removable tab that, upon removal, converts the adapter plate to accommodate the at least one electrical device.

5. The convertible electrical device cover of claim 4, wherein removal of the at least one removable tab allows conversion into at least one access opening that is configured to accommodate the at least one electrical device.

6. The convertible electrical device cover of claim 1, wherein the engaging mechanism is further configured to position the adapter plate to accommodate the at least one electrical device positioned in a plurality of orientations.

7. The convertible electrical device cover of claim 1 further comprising at least one removable hinge removably coupled to and extending outwardly from the base plate, the at least one removable hinge configured to pivotally couple with at least one hinge of a protective housing.

8. The convertible electrical device cover of claim 7 further comprising a flange coupled to and extending outwardly and continuously along a periphery of the base plate, the flange configured to accommodate the protective housing when in an operative position over the base plate.

9. A convertible electrical device cover comprising:
a base plate that is configured to accommodate at least one electrical device, the base plate comprising front and rear sides and at least one removable tab that, upon removal, allows conversion into at least one access opening that is configured to accommodate the at least one electrical device;
an adapter plate that is configured to accommodate the at least one electrical device, the adapter plate comprising front and rear sides and at least one removable tab that, upon removal, allows conversion into at least one access opening that is configured to accommodate the at least one electrical device; and an engaging mechanism that is configured to removably couple the front side of the adapter plate to the rear side of the base plate so that the adapter plate is located between the at least one electrical device and the rear side of the base plate when the convertible electrical device cover is placed in an operative position over the at least one electrical device, and so that at least one front face of the at least one electrical device is held in at least a flush engagement with the front side of the adapter plate.

10. The convertible electrical device cover of claim 9, wherein the at least one removable tab of the base plate comprises:

one center removable tab and four corner removable tabs forming part of a pair of access openings that are configured to accommodate a duplex electrical outlet, whereby upon removal of the one center removable tab and the four corner removable tabs a substantially rectangular access opening is formed that is configured to accommodate a ground fault current interrupter outlet.

11. The convertible electrical device cover of claim 10 further comprising a pair of removable tabs that, upon removal, allow conversion into the pair of access openings.

12. The convertible electrical device cover of claim 10 further comprising two flanking removable tabs forming part of the pair of access openings, whereby upon removal of the one center removable tab, the four corner removable tabs, and the two flanking removable tabs a larger access opening is formed.

13. The convertible electrical device cover of claim 12, wherein the adapter plate is configured to abut the base plate on all sides of the larger access opening.

14. The convertible electrical device cover of claim 9, wherein the at least one removable tab of the adapter plate comprises one center removable tab and four corner removable tabs forming part of a pair of access openings that are configured to accommodate a duplex electrical outlet, whereby upon removal of the one center removable tab and the four corner removable tabs a substantially rectangular access opening is formed that is configured to accommodate a ground fault current interrupter outlet.

15. The convertible electrical device cover of claim 14 further comprising a pair of removable tabs that, upon removal, allow conversion into the pair of access openings.

16. The convertible electrical device cover of claim 9, wherein the at least one removable tab of the adapter plate comprises a substantially circular removable tab forming an access opening configured to accommodate a toggle switch, whereby upon removal of the substantially circular removable tab a substantially circular access opening is formed that is configured to accommodate a round outlet.

17. The convertible electrical device cover of claim 16 further comprising a removable tab that, upon removal, allows conversion into the access opening that is configured to accommodate the toggle switch.

18. The convertible electrical device cover of claim 16 further comprising at least one substantially annular removable tab encompassing at least a portion of the substantially circular removable tab, whereby upon removal of the substantially circular removable tab and the at least one substantially annular removable tab at least one larger substantially circular access opening is formed that is configured to accommodate at least one larger round outlet.

19. The convertible electrical device cover of claim 9, wherein the engaging mechanism is:

at least one electrical device screw, at least one electrical device screw hole extending through the adapter plate, at least one adapter plate screw, and at least one adapter plate screw hole extending through the adapter plate, and wherein the at least one electrical device screw removably couples the adapter plate to the electrical device through the at least one electrical device screw hole and the at least one adapter plate screw removably couples the front side of the adapter plate to the rear side of the base plate through the at least one adapter plate screw hole;

a recess defined in the rear side of the base plate so that the front side of the adapter plate is configured to be removably coupled into the recess; or at least two opposing rails on the rear side of the base plate, wherein the adapter plate is configured to slidably removably couple between the at least two opposing rails.

20. The convertible electrical device cover of claim 9, wherein the engaging mechanism comprises:

opposing protrusions on the rear side of the base plate extending outwardly to a predetermined height, the opposing protrusions defining receiving notches positioned inwardly toward one another; and pins extending outwardly from opposing sides of the adapter plate, the pins configured to removably couple into the receiving notches.

21. The convertible electrical device cover of claim 20, wherein a thickness of the adapter plate is substantially the same as the predetermined height of the opposing protrusions.

22. The convertible electrical device cover of claim 20, wherein top sides of the opposing protrusions define recesses that are configured to receive screw heads.

23. The convertible electrical device cover of claim 20, wherein the opposing protrusions are located on a center line parallel to longer sides of the base plate.

24. The convertible electrical device cover of claim 23, wherein the receiving notches are located off of the center line parallel to the longer sides of the base plate.

25. The convertible electrical device cover of claim 20 further comprising:

an additional receiving notch defined in one of the opposing protrusions; and an additional pin extending outwardly from one of the opposing sides of the adapter plate that is configured to removably couple into the additional receiving notch, thereby properly positioning the adapter plate relative to the opposing protrusions.

26. A convertible electrical device cover comprising:

a base plate that is configured to accommodate at least one electrical device, the base plate comprising front and rear sides and at least one removable tab that, upon removal, converts the base plate to accommodate the at least one electrical device;

an adapter plate that is configured to accommodate the at least one electrical device, the adapter plate comprising front and rear sides and at least one removable tab that, upon removal, converts the adapter plate to accommodate the at least one electrical device; and an engaging mechanism that is configured to removably couple the adapter plate to the front side of the base plate so that the base plate is located between the at least one electrical device and the rear side of the adapter plate when the convertible electrical device cover is placed in an operative position over the at least one electrical device, and so that at least one front face of the at least one electrical device is held in at least a flush engagement with the front side of the adapter plate.

27. The convertible electrical device cover of claim 26, wherein removal of the at least one removable tab of the base plate allows conversion into at least one access opening that is configured to accommodate the at least one electrical device.

28. The convertible electrical device cover of claim 26, wherein removal of the at least one removable tab of the adapter plate allows conversion into at least one access opening that is configured to accommodate the at least one electrical device.

29. The convertible electrical device cover of claim 26, wherein the engaging mechanism is further configured to position the adapter plate to accommodate the at least one electrical device positioned in a plurality of orientations.

30. The convertible electrical device cover of claim 26 further comprising at least one removable hinge removably coupled to and extending outwardly from the base plate, the at least one removable hinge configured to pivotally couple with at least one hinge of a protective housing.

31. The convertible electrical device cover of claim 30 further comprising a flange coupled to and extending outwardly and continuously along a periphery of the base plate, the flange configured to accommodate the protective housing when in an operative position over the base plate.

32. A convertible electrical device cover comprising:
   a base plate that is configured to accommodate at least one electrical device, the base plate comprising front and rear sides and at least one removable tab that, upon removal, allows conversion into at least one access opening that is configured to accommodate the at least one electrical device;
   an adapter plate that is configured to accommodate the at least one electrical device, the adapter plate comprising front and rear sides and at least one removable tab that, upon removal, allows conversion into at least one access opening that is configured to accommodate the at least one electrical device; and
   an engaging mechanism that is configured to removably couple the rear side of the adapter plate to the front side of the base plate so that the base plate is located between the at least one electrical device and the rear side of the adapter plate when the convertible electrical device cover is placed in an operative position over the at least one electrical device, and so that at least one front face of the at least one electrical device is held in at least a flush engagement with the front side of the adapter plate.

33. The convertible electrical device cover of claim 32, wherein the at least one removable tab of the base plate comprises:
   one center removable tab and four corner removable tabs forming part of a pair of access openings that are configured to accommodate a duplex electrical outlet, whereby upon removal of the one center removable tab and the four corner removable tabs a substantially rectangular access opening is formed that is configured to accommodate a ground fault current interrupter outlet.

34. The convertible electrical device cover of claim 33 further comprising a pair of removable tabs that, upon removal, allow conversion into the pair of access openings.

35. The convertible electrical device cover of claim 33 further comprising two flanking removable tabs forming part of the pair of access openings, whereby upon removal of the one center removable tab, the four corner removable tabs, and the two flanking removable tabs a larger access opening is formed.

36. The convertible electrical device cover of claim 35, wherein the adapter plate is configured to abut the base plate on all sides of the larger access opening.

37. The convertible electrical device cover of claim 32, wherein the at least one removable tab of the adapter plate comprises one center removable tab and four corner removable tabs forming part of a pair of access openings that are configured to accommodate a duplex electrical outlet, whereby upon removal of the one center removable tab and the four corner removable tabs a substantially rectangular access opening is formed that is configured to accommodate a ground fault current interrupter outlet.

38. The convertible electrical device cover of claim 37 further comprising a pair of removable tabs that, upon removal, allow conversion into the pair of access openings.

39. The convertible electrical device cover of claim 32, wherein the at least one removable tab of the adapter plate comprises a substantially circular removable tab forming an access opening configured to accommodate a toggle switch, whereby upon removal of the substantially circular removable tab a substantially circular access opening is formed that is configured to accommodate a round outlet.

40. The convertible electrical device cover of claim 39 further comprising a removable tab that, upon removal, allows conversion into the access opening that is configured to accommodate the toggle switch.

41. The convertible electrical device cover of claim 39 further comprising at least one substantially annular removable tab encompassing at least a portion of the substantially circular removable tab, whereby upon removal of the substantially circular removable tab and the at least one substantially annular removable tab at least one larger substantially circular access opening is formed that is configured to accommodate at least one larger round outlet.

42. The convertible electrical device cover of claim 32, wherein the engaging mechanism is:
   at least one electrical device screw and at least one electrical device screw hole extending through the adapter plate, wherein the at least one electrical device screw removably couples the adapter plate to the at least one electrical device, thereby squashing the base plate between the adapter plate and the at least one electrical device;
   a recess defined in the front side of the base plate so that the rear side of the adapter plate is configured to be removably coupled into the recess; or
   opposing top and bottom key holes that extend fully through the adapter plate and align with underlying opposing top and bottom key holes, the underlying opposing top and bottom key holes extending fully through the base plate and aligning with underlying electrical device box holes, wherein corresponding electrical device box mounting screws extend through the top and bottom key holes of the adapter plate and the base plate and are removably coupled into corresponding box holes, thereby squashing the base plate between the adapter plate and the at least one electrical device.

43. A method of installing a convertible electrical device cover, the method comprising the steps of:
   placing the convertible electrical device cover in an operative position over at least one electrical device so as to locate an adapter plate configured to accommodate the at least one electrical device between the at least one electrical device and a rear side of a base plate configured to accommodate the at least one electrical device; and utilizing an engaging mechanism to removably couple a front side of the adapter plate to a rear side of the base plate so that at least one front face of the at least one electrical device is held in at least a flush engagement with the front side of the adapter plate.

44. The method of installing a convertible electrical device cover of claim 43 further comprising the step of removing at least one removable tab of the base plate, thereby converting the base plate to accommodate the at least one electrical device.

45. The method of installing a convertible electrical device cover of claim 44, wherein the step of removing the at least one removable tab further comprises forming at least one access opening that is configured to accommodate the at least one electrical device.

46. The method of installing a convertible electrical device cover of claim 43 further comprising the step of removing at least one removable tab of the adapter plate, thereby converting the adapter plate to accommodate the at least one electrical device.

47. The method of installing a convertible electrical device cover of claim 46, wherein the step of removing the at least one removable tab further comprises forming at least one access opening that is configured to accommodate the at least one electrical device.

48. The method of installing a convertible electrical device cover of claim 43, wherein the step of utilizing an engaging mechanism further comprises positioning the adapter plate to accommodate the at least one electrical device positioned in a plurality of orientations.

49. A method of installing a convertible electrical device cover, the method comprising the steps of:

removing at least one removable tab of a base plate that is configured to accommodate at least one electrical device, thereby forming at least one access opening that is configured to accommodate the at least one electrical device; and utilizing an engaging mechanism to removably couple a front side of an adapter plate that is configured to accommodate the at least one electrical device to a rear side of the base plate so that the adapter plate is located between the at least one electrical device and the rear side of the base plate when the convertible electrical device cover is placed in an operative position over the at least one electrical device, and so that at least one front face of the at least one electrical device is held in at least a flush engagement with the front side of the adapter plate.

50. The method of installing a convertible electrical device cover of claim 49, wherein the step of removing at least one removable tab of a base plate comprises removing one center removable tab and four corner removable tabs forming part of a pair of access openings that are configured to accommodate a duplex electrical outlet, thereby forming a substantially rectangular access opening that is configured to accommodate a ground fault current interrupter outlet.

51. The method of installing a convertible electrical device cover of claim 50, wherein the step of removing one center removable tab and four corner removable tabs further comprises removing a pair of removable tabs, thereby forming the pair of access openings.

52. The method of installing a convertible electrical device cover of claim 50, wherein the step of removing one center removable tab and four corner removable tabs further comprises removing two flanking removable tabs forming part of the pair of access openings, thereby forming a larger access opening.

53. The method of installing a convertible electrical device cover of claim 52, further comprising the step of abutting the adapter plate to the base plate on all sides of the larger access opening.

54. The method of installing a convertible electrical device cover of claim 49, wherein the method further comprises the step of removing at least one removable tab of the adapter plate, thereby forming at least one access opening that is configured to accommodate the at least one electrical device.

55. The method of installing a convertible electrical device cover of claim 54, wherein the step of removing at least one removable tab of the adapter plate comprises:

removing one center removable tab and four corner removable tabs forming part of a pair of access openings that are configured to accommodate a duplex electrical outlet, thereby forming a substantially rectangular access opening that is configured to accommodate a ground fault current interrupter outlet.

56. The method of installing a convertible electrical device cover of claim 55, wherein the step of removing one center removable tab and four corner removable tabs further comprises removing a pair of removable tabs, thereby forming the pair of access openings.

57. The method of installing a convertible electrical device cover of claim 54, wherein the step of removing at least one removable tab of the adapter plate comprises:

removing a substantially circular removable tab forming an access opening configured to accommodate a toggle switch, thereby forming a substantially circular access opening that is configured to accommodate a round outlet.

58. The method of installing a convertible electrical device cover of claim 57, wherein the step of removing a substantially circular removable tab further comprises removing a removable tab, thereby forming the access opening that is configured to accommodate the toggle switch.

59. The method of installing a convertible electrical device cover of claim 57, wherein the step of removing a substantially circular removable tab further comprises removing at least one substantially annular removable tab encompassing at least a portion of the substantially circular removable tab, thereby forming at least one larger substantially circular access opening that is configured to accommodate at least one larger round outlet.

60. A method of installing a convertible electrical device cover, the method comprising the steps of:

removing at least one removable tab of a base plate that is configured to accommodate at least one electrical device, thereby converting the base plate to accommodate the at least one electrical device;

removing at least one removable tab of an adapter plate that is configured to accommodate at least one electrical device, thereby converting the adapter plate to accommodate the at least one electrical device;

placing the convertible electrical device cover in an operative position over at least one electrical device so as to locate the base plate between the at least one electrical device and a rear side of the adapter plate; and utilizing an engaging mechanism to removably couple the adapter plate to a front side of the base plate so that at least one front face of the at least one electrical device is held in at least a flush engagement with the front side of the adapter plate.

61. The method of installing a convertible electrical device cover of claim 60, wherein the step of removing the at least one removable tab of the base plate further comprises forming at least one access opening that is configured to accommodate the at least one electrical device.

62. The method of installing a convertible electrical device cover of claim 60, wherein the step of removing the at least one removable tab of the adapter plate further comprises forming at least one access opening that is configured to accommodate the at least one electrical device.

63. The method of installing a convertible electrical device cover of claim 60, wherein the step of utilizing an engaging mechanism further comprises positioning the adapter plate to accommodate the at least one electrical device positioned in a plurality of orientations.

64. A method of installing a convertible electrical device cover, the method comprising the steps of:
    removing at least one removable tab of a base plate that is configured to accommodate at least one electrical device, thereby forming at least one access opening that is configured to accommodate the at least one electrical device;
    removing at least one removable tab of an adapter plate that is configured to accommodate at least one electrical device, thereby forming at least one access opening that is configured to accommodate the at least one electrical device; and
    utilizing an engaging mechanism to removably couple a rear side of the adapter plate to a front side of the base plate so that the base plate is located between the at least one electrical device and the rear side of the adapter plate when the convertible electrical device cover is placed the at least one electrical device is held in at least a flush engagement with the front side of the adapter plate.

65. The method of installing a convertible electrical device cover of claim 64, wherein the step of removing at least one removable tab of a base plate comprises removing one center removable tab and four corner removable tabs forming part of a pair of access openings that are configured to accommodate a duplex electrical outlet, thereby forming a substantially rectangular access opening that is configured to accommodate a ground fault current interrupter outlet.

66. The method of installing a convertible electrical device cover of claim 65, wherein the step of removing one center removable tab and four corner removable tabs further comprises removing a pair of removable tabs, thereby forming the pair of access openings.

67. The method of installing a convertible electrical device cover of claim 65, wherein the step of removing one center removable tab and four corner removable tabs further comprises removing two flanking removable tabs forming part of the pair of access openings, thereby forming a larger access opening.

68. The method of installing a convertible electrical device cover of claim 67, further comprising the step of abutting the adapter plate to the base plate on all sides of the larger access opening.

69. The method of installing a convertible electrical device cover of claim 64, wherein the step of removing at least one removable tab of the adapter plate comprises:
    removing one center removable tab and four corner removable tabs forming part of a pair of access openings that are configured to accommodate a duplex electrical outlet, thereby forming a substantially rectangular access opening that is configured to accommodate a ground fault current interrupter outlet.

70. The method of installing a convertible electrical device cover of claim 69, wherein the step of removing one center removable tab and four corner removable tabs further comprises removing a pair of removable tabs, thereby forming the pair of access openings.

71. The method of installing a convertible electrical device cover of claim 64, wherein the step of removing at least one removable tab of the adapter plate comprises:
    removing a substantially circular removable tab forming an access opening configured to accommodate a toggle switch, thereby forming a substantially circular access opening that is configured to accommodate a round outlet.

72. The method of installing a convertible electrical device cover of claim 71, wherein the step of removing a substantially circular removable tab further comprises removing a removable tab, thereby forming the access opening that is configured to accommodate the toggle switch.

73. The method of installing a convertible electrical device cover of claim 72, wherein the step of removing a substantially circular removable tab further comprises removing at least one substantially annular removable tab encompassing at least a portion of the substantially circular removable tab, thereby forming at least one larger substantially circular access opening that is configured to accommodate at least one larger round outlet.

74. A convertible electrical device cover comprising:
    a base plate that is configured to accommodate at least one electrical device; and
    an adapter plate that is configured to accommodate the at least one electrical device, the adapter plate comprising front and rear sides and at least one removable tab that, upon removal, allows conversion into at least one access opening that is configured to accommodate the at least one electrical device, wherein the adapter plate is removably coupled to the base plate.

75. The convertible electrical device cover of claim 74, wherein the adapter plate is located between the at least one electrical device and the rear side of the base plate when the convertible electrical device cover is placed in an operative position over the at least one electrical device.

76. The convertible electrical device cover of claim 75 further comprising an engaging mechanism that is configured to removably couple the front side of the adapter plate to the rear side of the base plate so that at least one front face of the at least one electrical device is held in at least a flush engagement with the front side of the adapter plate.

77. The convertible electrical device cover of claim 76, wherein the engaging mechanism is further configured to position the adapter plate to accommodate the at least one electrical device positioned in a plurality of orientations.

78. The convertible electrical device cover of claim 74, wherein the base plate is located between the at least one electrical device and the rear side of the adapter plate when the convertible electrical device cover is placed in an operative position over the at least one electrical device.

79. The convertible electrical device cover of claim 78 further comprising an engaging mechanism that is config ured to removably couple the rear side of the adapter plate to the front side of the base plate so that at least one front face of the at least one electrical device is held in at least a flush engagement with the front side of the adapter plate.

80. The convertible electrical device cover of claim 79, wherein the engaging mechanism is further configured to position the adapter plate to accommodate the at least one electrical device positioned in a plurality of orientations.

81. The convertible electrical device cover of claim 74, the base plate comprising front and rear sides and at least one removable tab that, upon removal, allows conversion into at least one access opening that is configured to accommodate the at least one electrical device.

* * * * *

UNITED STATES PATENT AND TRADEMARK OFFICE
CERTIFICATE OF CORRECTION

PATENT NO. : 6,642,453 B2  Page 1 of 1
DATED : November 4, 2003
INVENTOR(S) : Shotey et al.

It is certified that error appears in the above-identified patent and that said Letters Patent is hereby corrected as shown below:

Column 23,
Line 25, should read as follows:
    A method of installing a convertible electrical device cover, that method comprising the steps of:
    removing at least one removable tab of a base plate that is configured to accommodate at least one electrical device, thereby forming at least one access opening that is configured to accommodate the at least one electrical device;
    removing at least one removable tab of an adapter plate that is configured to accommodate at least one electrical device, thereby forming at least one access opening that is configured to accommodate the at least one electric device; and
    utilizing an engaging mechanism to removably couple a rear side of the adapter plate to a front side of the base plate so that the base plate is located between the at least one electrical device and the rear side of the adapter plate when the convertible electrical device cover is placed in an operative position over the at least one electrical device, and so that at least one front face of the at least one electrical device is held in at least a flush engagement with the front side of the adapter plate.

Signed and Sealed this

Ninth Day of March, 2004

JON W. DUDAS
*Acting Director of the United States Patent and Trademark Office*